United States Patent [19]
Gardner et al.

[11] Patent Number: 5,299,148
[45] Date of Patent: Mar. 29, 1994

[54] SELF-COHERENCE RESTORING SIGNAL EXTRACTION AND ESTIMATION OF SIGNAL DIRECTION OF ARRIVAL

[75] Inventors: William A. Gardner, Yountville; Stephan V. Schell, Livermore; Brian G. Agee, San Jose, all of Calif.

[73] Assignee: The Regents of the University of California, Oakland, Calif.

[21] Appl. No.: 526,840

[22] Filed: May 22, 1990

Related U.S. Application Data

[63] Continuation-in-part of Ser. No. 264,256, Oct. 28, 1988, abandoned.

[51] Int. Cl.$^5$ .............................................. G06F 15/00
[52] U.S. Cl. ................................... 364/574; 364/572; 364/581; 342/378
[58] Field of Search .......... 364/574, 554, 715, 724.08, 364/724.09, 572, 581, 724.19; 455/307, 315, 303, 305, 306; 375/99, 102, 103, 1, 115; 342/378

[56] References Cited

U.S. PATENT DOCUMENTS

| | | | |
|---|---|---|---|
| 3,626,168 | 12/1971 | Norsworthy | 364/554 |
| 3,947,634 | 3/1976 | Betts | 375/115 |
| 3,997,844 | 12/1976 | Jayant | 455/303 |
| 4,005,426 | 1/1977 | White | 325/305 |
| 4,017,798 | 4/1977 | Gordy et al. | 375/1 |
| 4,039,749 | 8/1977 | Gordy et al. | 375/115 |
| 4,122,393 | 10/1978 | Gordy et al. | 375/115 |
| 4,169,245 | 9/1979 | Cron et al. | 325/58 |
| 4,198,634 | 4/1980 | Jernigan et al. | 324/77 K |
| 4,222,051 | 9/1980 | Kretschmer, Jr. et al. | 455/303 |
| 4,255,791 | 3/1981 | Martin | 364/574 |
| 4,283,767 | 8/1981 | Rountree | 364/574 |
| 4,408,332 | 10/1983 | Sari | 375/99 |
| 4,688,187 | 8/1987 | McWhirter | 342/381 |
| 4,931,977 | 6/1990 | Klemes | 364/581 |

FOREIGN PATENT DOCUMENTS 2166326 4/1986 United Kingdom ................ 455/305

OTHER PUBLICATIONS

Kidron; Enhancement of SNR of Turbulence Measurements by Cross Correlation; IEEE Jun. 1967 pp. 156–163.

Sambur; Adaptive Noise Cancelling for Speech Signals; IEEE Oct. 1978, pp. 419–423.

B. Widrow, P. E. Mantey, L. J. Griffiths, B. B. Goode, "Adaptive Antenna Systems", IEEE Proceedings, vol. 55, No. 12, pp. 2143–2159, Dec. 1967.

L. J. Griffiths, "A Simple Adaptive Algorithm for Real-Time Processing in Antenna Arrays", Proc. IEEE, vol. 57, pp. 1696–1704, Oct. 1969.

O. L. Frost, "An Algorithm for Linearly Constrained Adaptive Array Processing", Proc. IEEE, vol. 60, pp. 926–935, Aug. 1972.

Y. Sato, "A Method of Self-Recovering Equalization for Multilevel Amplitude Modulation Systems", IEEE Trans. Comm., vol. Com 23, pp. 679–682, Jun. 1975.

S. P. Applebaum, "Adaptive Arrays", IEEE Trans. on Antennas and Propagation, vol. AP-24, No. 5, pp. 585–598, Sep. 1976.

R. T. Compton, "An Adaptive Array in a Spread Spectrum Communication System", Proc. IEEE, vol. 66, pp. 289–298, Mar. 1978.

R. O. Schmit, "Multiple Emitter Location and Signal Parameter Estimation", Proc. RADC Spectrum Estimation Workshop, Oct. 1979.

(List continued on next page.)

*Primary Examiner*—Thomas G. Black
*Assistant Examiner*—Michael Zanelli
*Attorney, Agent, or Firm*—John P. O'Banion

[57] ABSTRACT

A processor and method for extracting or estimating directions of arrival of signals from a received data vector x(t) which has been corrupted by interfering signals and noise is described. The processor extracts signals by forming the scalar product of x(t) and a weight vector which is chosen such that the spectral self-coherence or conjugate spectral self-coherence of the processor output is maximized. The processor estimates the directions of arrival of signals by spectral self-coherence-selective performance surfaces for maxima.

41 Claims, 16 Drawing Sheets

OTHER PUBLICATIONS

R. A. Monzingo, T. W. Miller, "Introduction to Adaptive Arrays", pp. 319–347, John Wiley & Sons, New York, 1980.

D. N. Godard, "Self-Recovering Equalization and Carrier Tracking in Two-Dimensional Data Communication Systems", IEEE Trans. Comm., vol. COM-28, pp. 1867–1875, Nov. 1980.

B. Friedlander, "Lattice Filters for Adaptive Processing", Proc. IEEE, vol. 70, No. 8, pp. 829–867, Aug. 1982.

J. G. Proakis, "Digital Communications", pp. 382–447, McGraw-Hill, 1983.

J. R. Treicher, B. G. Agee, "A New Approach to Multipath Correction of Constant Modulus Signals", IEEE Trans. ASSP, vol. ASSP-31, pp. 459–472, Apr. 1983.

M. Wax, T. Shan, T. Kailath, "Spatio–Temporal Spectral Analysis by Eigenstructure Methods", IEEE Trans. ASSP., vol. ASSP-32, No. 4, pp. 817–827, Aug. 1984.

A. Paulraj, R. Roy, T. Kailath, "Estimation of Signal Parameters via Rotational Invariance Techniques–ESPRIT", Proc. Nineteenth Asilomar Conf. on Signals, Systems and Computers, Pacific Grove, Calif., Nov. 1985.

L. J. Griffiths, M. J. Rude, "The P–Vector Algorithm: A Linearly Constrained Point of View", Proc. Twentieth Asilomar Conf. on Signals, Systems and Computers, Pacific Grove, Calif., Nov. 1986.

J. A. Cadzow, "Signal Enhancement—a Composite Property Mapping Algorithm", IEEE Trans. ASPP, vol. 36, No. 1, pp. 49–62, Jan. 1988.

S. V. Schell, B. G. Agee, "Application of the SCORE Algorithm and SCORE Extension to Sorting in Rank-L Spectral Self-Coherence Environment", 22d Asilomar Conference on Signals, Systems, and Computers, Pacific Grove, Calif., Nov. 1988.

B. G. Agee, "Application of Spectral Self-Coherence to Adaptive Array Processing", Information System Lab. at Stanford University, Dec. 17, 1988.

B. G. Agee, "The Property Restoral Approach to Blind Adaptive Signal Extraction", Doctoral Dissertation, University of California, Davis Calif., Sep. 1989.

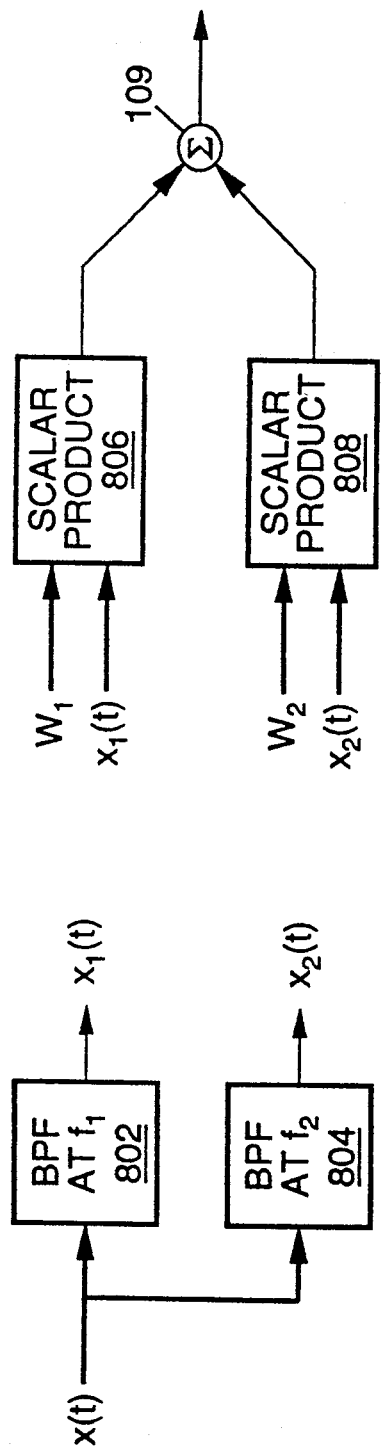
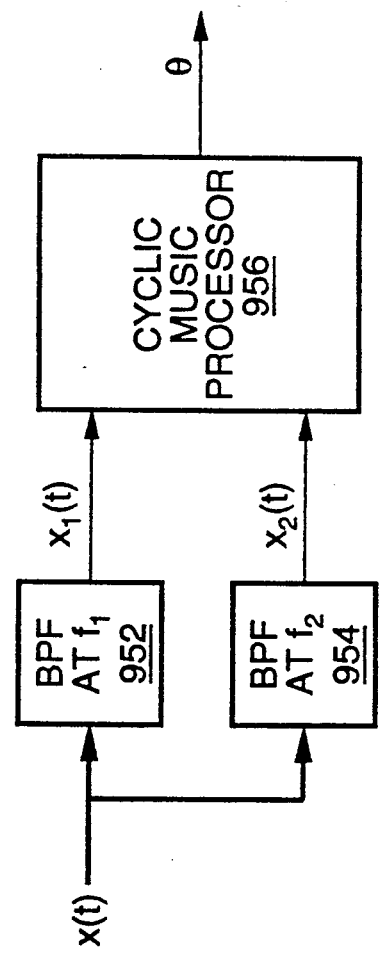

SELF-COHERENCE RESTORING SIGNAL EXTRACTION AND ESTIMATION OF SIGNAL DIRECTION OF ARRIVAL

This invention was made with Government support under Grant/Contract No. MIP-88-12902 awarded by the National Science Foundation. Additional support was provided by the Army Research Office under contract No. DAAL03-89-C-0035 through Statistical Signal Processing, Inc. The Government has certain rights in this invention.

CROSS-REFERENCE TO RELATED APPLICATION

This is a continuation-in-part of application Ser. No. 264,256, filed Oct. 28, 1988 now abandoned.

BACKGROUND OF THE INVENTION

1. Technical Field of the Invention

The present invention relates to signal processing and, more particularly, but still generally, to signal processing systems for extracting communication signals from environments containing uncorrelated co-channel interference, and for signal-selective direction finding.

2. Description of Background and Related Art

The problem of extracting a signal from a noisy environment is well known in the signal processing arts. The fundamental problem facing any receiver designer is how to improve the reception of a desired signal in the presence of unknown and undesired interfering signals, channel distortion, and thermal background noise. In principle, this can be accomplished by signal processing. For example, consider a multisensor receiver consisting of an array of spatially-separated antennae which is receiving a desired signal from a first direction and interfering signals from other directions. By forming the appropriate linear combination of the sensor outputs, the signals arriving from the desired direction will be accentuated while signals from other directions are attenuated. Similarly, in single sensor receivers, notch filters can be used to place notches at the frequencies of narrowband interfering signals and other filter types can be used to equalize linear channel distortion. In both cases, the desired signal reception can be significantly improved by passing the received signal (or signals) through a linear combiner with the proper combiner weights.

The basic problem is to set the combiner weights. If all of the parameters of the interfering signals are known, the proper combiner weights can be calculated. Unfortunately, such information is not always available. In many practical communications problems, the dominant type of channel corruption may be known. However, even in those cases in which the type of corruption is known, it may not be possible to know the number, strength, or directions-of-arrival of the interfering signals at any given time. For example, in mobile radio applications, these interference parameters will depend on the time of day and the physical location of the transmitter and receiver. In this case, not only will the parameters be unknown at the beginning of the transmission, but also, they may vary during the transmission.

In such environments, it is usually impossible to preset the linear combiner weights to significantly improve reception of the desired signal. Hence, an adaptive algorithm must be used to learn the correct weight settings and to vary these settings over the course of the transmission if the parameters vary. This is accomplished by exploiting some known characteristic of the desired signal that distinguishes it from the interfering signals and noise.

Prior art methods for calculating the combiner weights have focused primarily on methods that optimize some measure of signal quality. A number of different quality measures have been used. For example, the Applebaum algorithm (S. P. Applebaum, "Adaptive Arrays," Syracuse University Research Corporation," Rep. SPLTR66-1, August 1966) maximizes the signal-to-noise ratio at the output to the array. The Widrow-Hoff least-mean-square algorithm (B. Widrow, "Adaptive Filters I: Fundamentals, Stanford University Electronics Laboratory, Rep. SU-SEL-66-12, Tech. Rep. 6764-6, December 1966) minimizes the mean-square-error between the desired signal and the output of an adaptive array.

More recently, exact least squares algorithms which optimize deterministic, time-averaged measures of output signal quality have been developed (P. E. Mantey, L. J. Griffiths, "Iterative Least-Squares Algorithms for Signal Extraction," Second Hawaii Conference on Systems Science, January 1969, pp. 767-770, B. Friedlander, "Lattice Filters for Adaptive Processing," Proc. pp. 879-867, August 1982). In directly implementing an adaptive processor that optimizes any such quality measure, the receiver designer must have accurate knowledge of the cross-correlation between the transmitted and received signals. In practice, this requires close cooperation between the receiver and the desired-signal transmitter. In applications where the cross-correlations are not known at the start of the desired-signal transmission, these statistics must be learned by the receiver at the start of the transmission and, on time-varying channels, updated over the course of the transmission.

The earliest methods for accomplishing this in telecommunications applications required the transmitter to send a known signal over the channel. This signal was sent at the beginning of the transmission or intermittently in lieu of the information-bearing signal. In this manner, the receiver could be trained at the start of the transmission and the combiner weights updated during the transmission. Other embodiments of this type of system transmit a pilot signal along with the information-bearing signal. This pilot signal is used to train and continuously adapt the receiver. These methods are effective in those situations in which there is cooperation between the transmitter and receiver.

In many applications, however, quality-optimizing techniques cannot be directly used. For example, the channel may be varying too rapidly for start-up or intermittent adaptation to be effective. In addition, the system resources (power, dynamic-range, bandwidth, etc.) may be too limited to allow pilot signals to be added to the information-bearing signal Alternatively, the receiver may not have the necessary control over the transmitter. This is the case when the transmitter is a natural source such as a person speaking, or when the receiver that must be adapted is not the intended receiver in the communication channel, e.g., in reconnaissance applications.

In applications in which a known desired signal cannot be made available to the receiver, the designer must make use of blind adaptation techniques that exploit other observable properties of the desired signal or the environment in which the signal is transmitted. Prior art algorithms for accomplishing this may be divided into three classes. In the first class of techniques, referred to as demodulation-directed techniques, a reference signal is produced by demodulating and remodulating the processor output signal. This reference signal is then used as a training signal in a conventional adaptive processing algorithm. This technique is commonly employed in decision-directed and decision-feedback equalizers in telephony systems (J. G. Proakis, "Advances in Equalization of Intersymbol Interference," *Advances in Communications Systems,* ed. by A. V. Balakrishnan, A. J. Viterbi, N.Y. Academic Press, 1975). It has also been used to adapt antenna arrays in spread-spectrum communication systems (A. T. Compton, "An Adaptive Array in a Spread Spectrum Communications System," *Proc. IEEE,* Vol. 66, March 1978).

The primary advantage of demodulation-directed techniques lies in their efficient use of system resources and in their convergence speed. These algorithms rely on the demodulator-remodulator loop providing a very clean estimate of the desired signal. In most of these techniques, this requirement will be met after the demodulator has locked on to the received signal. However, until the demodulator does lock on, the reference signal estimate will generally be poor. For this reason, most demodulation-directed techniques are employed as tracking algorithms after a more sophisticated technique has been used to lock onto the desired signal. Many demodulation directed techniques encounter additional problems in dynamic environments where signals are appearing and disappearing over the course of the desired-signal transmission. In addition, these techniques are expensive to implement and are inflexible in their implementation, since they require a built-in demodulator matched to a specific desired signal to operate. This drawback renders them inapplicable to a system in which a variety of signals are of interest, e.g., in satellite transponders and reconnaissance systems.

The second class of techniques, referred to as channel-directed techniques, exploit known properties of the receiver channel or environment such as the spatial distribution of the received signals. In this class of techniques, knowledge of the receiver channel is used to generate and apply a reference signal to a conventional adaptation algorithm, or to estimate key statistics which are used to optimize the combiner weights. When applied to antenna arrays, most channel-directed methods exploit the discrete spatial distribution of the signals received by the array, i.e., the fact that the received signals impinge on the array from discrete directions of arrival. Examples of channel-directed techniques include the Griffiths P-vector algorithm (L. J. Griffiths, "A Simple Adaptive Algorithm for Real-Time Processing in Antenna Arrays," *Proc. IEEE,* Vol. 57, October, 1969) and the Frost constrained LMS algorithm (O. L. Frost, "An Algorithm for Linearly-Constrained Adaptive Array Processing," *Proc. IEEE,* Vol. 60, August 1972). Both of these techniques exploit the known direction-of-arrival of the desired signal. Techniques have also been devised to deal with the situation in which the direction-of-arrival of the desired-signal is unknown. Examples of such techniques are the generalized sidelobe canceller (L. J. Griffiths, M. J. Rude, "The P-Vector Algorithm: A Linearly Constrained Point of View," *Proc. Twentieth Asilomar Conf. on Signals, Systems and Computers,* Pacific Grove, Calif., November 1986) and the signal subspace techniques referred to as MUSIC (R. O. Schmidt, "Multiple Emitter Location and Signal Parameter Estimation," *Proc. RADC Spectrum Estimation Workshop,* October 1979. M. Wax, T. Shan, T. Kailath, "The Covariance Eigenstructure Approach to Detection and Estimation by Passive Arrays," *IEEE Trans.* ASSP, 1985) and ESPRIT (A. Paulraj, A. Roy, T. Kailath, "Estimation of Signal Parameters via Rotational Invariance Techniques-ESPRIT," *Proc. Nineteenth Asilomar Conf. on Signals, Systems and Computers,* Pacific Grove, Calif., November 1985). These approaches can all be thought of as high-resolution spatial spectrum estimation techniques for locating lines in the received signal spatial spectrum.

All of the channel-directed techniques suffer from the common weakness that they require knowledge of the sensor geometry and/or the individual sensor or subarray characteristics to adapt the array. In practice, this characterization is usually obtained by a series of experiments, referred to as array calibration, to determine the so-called array manifold of the sensor network. The cost of array calibration can be quite high, and the measurement procedure is, in many applications, impractical. For example, a $16 \times 16$ planar array calibrated over a sphere with a one degree resolution in elevation and azimuth, and using 16 bit accuracy requires approximately 64 megabytes of storage. This storage requirement increases exponentially as the number of search dimensions is increased, e.g., if the calibration is performed over temporal frequency or polarization in addition to elevation and azimuth. In addition, systems with considerably more sensors are desirable. Phased array communication systems have currently been proposed with over 10,000 elements, and current advances in low-cost microwave radio are pushing this figure higher. The storage requirements, not to mention the calibration times, for such large arrays renders these methods impractical. Furthermore, in certain applications, e.g., lightweight spaceborne arrays, airborne arrays, and towed acoustic arrays, the array geometry and even the sensor characteristics may be changing slowly with time; hence, an accurate set of calibration data may never be available.

Even when calibration data is available, the computational cost of using this data can be prohibitive. Both the generalized sidelobe canceller and MUSIC techniques require a search over the set of calibration data during the operation of the algorithm. In addition, the computational complexity of the MUSIC algorithm increases as the cube of the number of sensors in the array. The required computational complexity can be prohibitive. Also, the additional classification operations required to recognize the one desired signal among the multiple signals extracted by the algorithms increase the complexity even more.

The ESPRIT technique was proposed in an effort to overcome these computational and storage problems. This technique does not require calibration data to operate and hence, avoids many of the problems associated with the other channel-directed approaches. However, ESPRIT requires accurate knowledge of the noise covariance matrix of the received data, and its computational difficulty increases as the cube of the number of sensors in the array. The ESPRIT algorithm has a number of other shortcomings. It does not perform optimal signal extraction in the sense that the signal-to-noise-ratio is maximized, but instead, each output solution nulls simply all signals but one impinging on the array. In addition, the ESPRIT algorithm requires that the array elements be grouped into doublets with identical characteristics and common geometrical displacement. These conditions impose serious constraints on both the manufacture and performance of an ESPRIT array.

In the third class of techniques, referred to as set-theoretic property-mapping and property-restoral techniques, the output of the receiver is forced to possess a set of known properties possessed by the transmitted signal. Here, the receiver processor is adapted to restore known modulation properties of the desired signal to the processor output signal. Modulation properties are defined here as observable properties of the desired signal imparted by the modulation format used at the desired-signal transmitter. In many cases, these properties are destroyed by transmission over the communication channels. For example, the constant modulus property shared by FM, PSK, and CPFSK is destroyed by the addition of noise, other signals, or multipath interference to the transmitted signal. The property-restoral approach adapts a receiver processor to optimize an objective function that measures this property in the output signal.

The first use of the property-restoral concept was in Sato's algorithm (Y. Sato, "A Method of Self-Recovering Equalization for Multilevel Amplitude Modulation Systems," *IEEE Trans. Comm.*, vol. COM-23, pp. 679–682, June 1975) which was designed to equalize channel distortion in a BPSK telephony signal by minimizing the mean square error between the squared signal and unity. This algorithm was extended to restoral of general constant-modulus and QAM communication signals with the Constant-Modulus Algorithm (J. R. Treichler, B. C. Agee, "A New Approach to Multipath Correction of Constant Modulus Signals," *IEEE Trans. ASSP, vol. ASSP*-31, pp. 459–472, April 1983) and Godard's algorithm (D. N. Godard, "Self-Recovering Equalization and Carrier Tracking in Two-Dimensional Data Communication Systems," *IEEE Trans. Comm.*, vol. COM-28, pp. 1867–1875, November 1980). More recently, set-theoretic property mapping (J. A. Cadzow, "Signal Enhancement—a Composite Property Mapping Algorithm," *IEEE Trans ASSP*, January 1988) has been advanced as a general technique for designing property-restoral algorithms (B. G. Agee, "The Property Restoral Approach to Blind Adaptive Signal Extraction," University of California, Davis Calif., September 1989 (Doctoral Dissertation).

The property-restoral algorithms described above have been successfully applied to adaptive signal extraction in both filters and antenna arrays and appear to have strong advantages over both the demodulation-directed and channel-directed techniques. However, these techniques still have drawbacks. The convergence and capture characteristics of all of these algorithms are still not well understood. In addition, the Constant-Modulus Algorithms are highly nondiscriminatory, requiring multitarget implementations to recover all the signals present in dense interference environments. The former drawback limits the application of these algorithms in automatic (unsupervised) communication systems where they must operate with a minimum of attention. The latter drawback is of critical importance in large-aperture systems and directed search applications, since it requires the algorithms to extract every signal in the environment using a multitarget implementation and to then classify the signals to find the one desire signal.

Another problem encountered in signal processing is providing high resolution estimation of the directions of arrival (DOA) of signals impinging on an antenna array.

The conventional MUSIC algorithm for high-resolution DOA estimation exploits the spatial coherence properties of signal sources having a discrete spatial distribution by exploiting the resulting structure of the array autocorrelation matrix. As is known in the art, given correct knowledge of the noise autocorrelation matrix, the MUSIC algorithm can remove the noise contribution from the array autocorrelation matrix, leaving only the signal components. If there remain fewer such signal components than there are array sensors, and if no two signals are perfectly correlated, then the null space of the signal-only autocorrelation matrix is orthogonal to the direction vectors of those signals. Thus, using calibration data for the array, the MUSIC algorithm searches over all possible DOAs for the directions that maximize a specific measure of orthogonality. Those DOAs are taken to be the DOA estimates. If the interference autocorrelation matrix is known as well, then interfering signal components can also be removed, leaving degrees of freedom available for estimating DOAs of desired signals.

The relevant limitations of the MUSIC algorithm are summarized here. (1) Lack of knowledge of the interference autocorrelation matrix requires MUSIC to estimate DOAs of all signals impinging on the array. (2) There must be fewer signals impinging on the array (excluding signals accounted for in the interference autocorrelation matrix, if any) than there are sensors in order to obtain useful DOA estimates. (3) With limitations on the amount of data processed, the DOA of a desired signal cannot be distinguished from that of a sufficiently closely spaced interferer if that interferer is not accounted for in the interference autocorrelation matrix. (4) Correct knowledge of the noise autocorrelation matrix is required to obtain useful DOA estimates. (5) No two signals may be perfectly correlated as can occur in multipath environments or in the presence of "smart" jammers.

Because of these disadvantages, the MUSIC algorithm for high resolution DOA estimation, as well as most others, performs poorly or fails entirely in many environments.

A further problem encountered in signal processing is that the developed methods for extracting signals and/or estimating signal DOA, which adapt to narrowband signals, may not be valid for wideband conditions. Thus, it is desirable to extend the method for extracting and/or estimating signal DOA for narrowband conditions to wideband conditions.

Broadly, it is an object of the present invention to provide improved methods for adapting receivers for the estimation of directions-of-arrival of communications signals, and for the extraction of communications signals.

It is another object of the present invention to provide an apparatus and method for extracting signals that do not require a knowledge of the desired signal waveform.

It is yet another object of the present invention to provide an extraction apparatus and method that do not require a knowledge of the direction-of-arrival of the desired signal.

It is a still further object of the present invention to provide an extraction apparatus and method that do not require a knowledge of the background interference environment.

It is yet another object of the present invention to provide an extraction apparatus and method that do not require a knowledge of the geometry of the sensor array or of the individual sensor characteristics.

It is a still further object of the present invention to provide an extraction apparatus and method that can be programmed to sort and automatically extract signals with desired statistical properties from dense interference environments.

It is yet another object of the present invention to provide an extraction apparatus and method that require substantially less computation and storage than prior art competing methods.

It is a still further object of the present invention to provide an extraction apparatus and method that have unambiguous and well-understood convergence and capture properties.

It is another object of the present invention to provide an apparatus and method that are more effective for high resolution of the DOA of signals impinging on an antenna array.

It is still another object of the present invention to provide an apparatus and method which are able to perform DOA estimation without knowledge of the noise and interference autocorrelation matrices.

It is another object of the present invention to provide an apparatus and method able to perform DOA estimation even if an arbitrary number of arbitrarily closely spaced interferers are present.

It is still another object of the present invention to provide an apparatus and method for DOA estimation, which operate effectively in the presence of perfectly correlated signals.

It is another object of the present invention to provide an apparatus and method for DOA estimation wherein the only requirement is that the number of signals spectrally self-coherent at the chosen frequency-shift are less than the number of sensors.

It is yet another object to apply the methods and apparatus of the present invention to wideband conditions.

These and other objects of the present invention will be apparent to those skilled in the art from the following detailed description of the invention and the accompanying drawings.

SUMMARY OF THE INVENTION

The present invention comprises a processor and method for extracting a signal s(t) from a signal input vector x(t) in which each component comprises a complex measurement of s(t) together with interference from noise and/or other signals. The processor computes an output signal y(t) by forming the scalar product of x(t) and a vector w having the same number of components as x(t) and chosen such that the self-coherence of y(t) at frequency shift $\alpha$ and time shift $\tau$ is substantially maximized for predetermined values of $\alpha$ and $\tau$.

The present invention also estimates the direction of arrival of a signal by processing the same frequency-shifted and time-shifted data that is used in the process of performing signal extraction.

The present invention also extends the method of extracting a signal and the method of estimating the direction of arrival of a signal to wideband conditions.

BRIEF DESCRIPTION OF THE DRAWINGS

FIGS. 8A and 8B are block diagrams of a dual-band SCORE processor for signal extraction, according to the present invention;

FIG. 11 is a block diagram of a dual-band Cyclic MUSIC processor for direction of arrival ("DOA") estimation, according to the present invention;

DETAILED DESCRIPTION OF THE PREFERRED EMBODIMENTS

Least Squares SCORE and Cross-SCORE Extraction

Figure 1B:
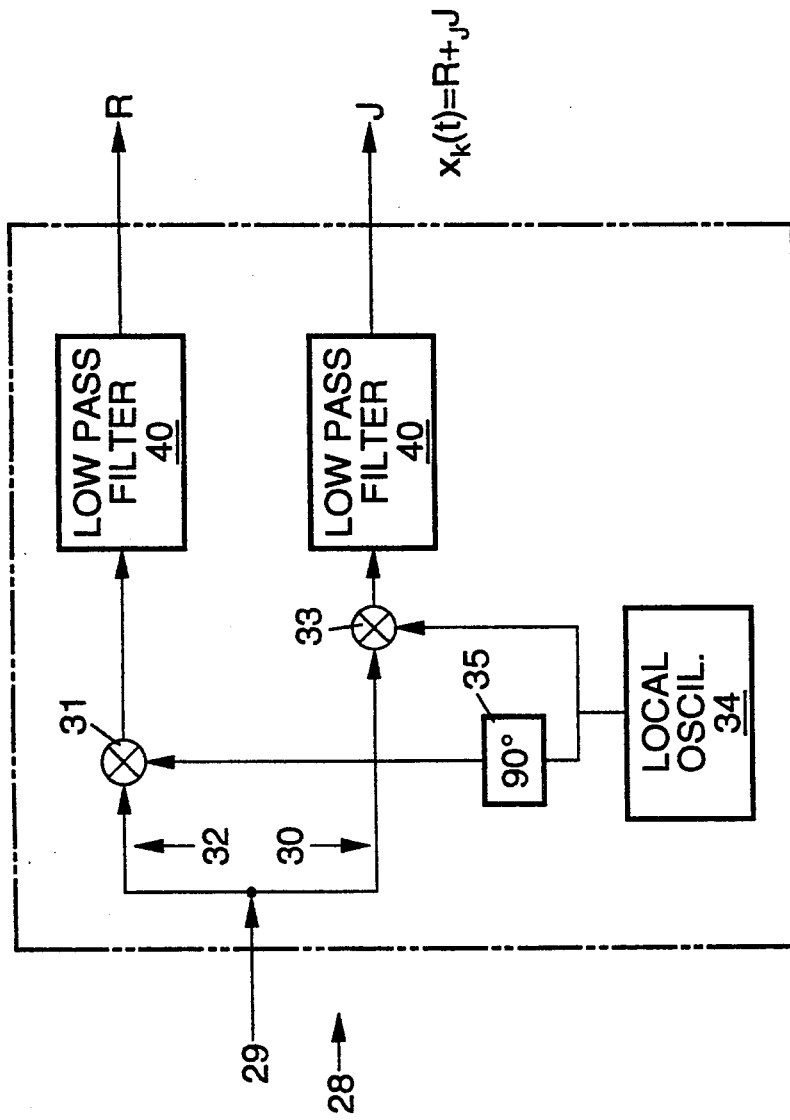
FIG. 1(b) is a block diagram of the preferred embodiment of the receiver circuit shown in FIG. 1(a).

The present invention comprises a method and apparatus for adapting an antenna array to extract a communication signal-of-interest with known self-coherence or conjugate self-coherence properties from environments containing uncorrelated co-channel interference. The present invention does not require a knowledge of the waveform or of the direction-of-arrival of the signal-of-interest. Furthermore, the present invention accomplishes this goal without requiring a knowledge of the array geometry or of the individual sensor characteristics. Finally, the method has a relatively simple and flexible implementation compared to the competing present art techniques described above.

The present invention may be most easily understood with reference to an array of M sensors. If the individual sensors have radio frequency outputs, the outputs are first downconverted to baseband or an intermediate frequency (IF). The converted sensor output signals are then converted to a complex representation either by a Hilbert transform operation or a separate downconversion of in-phase and quadrature components, to form a multisensor received signal represented by a vector x(t) which is defined by the following relationship $$x(t) = [x_k(t)] k = 1/M,  \quad (1)$$

where $x_k(t)$ is the complex signal from the kth sensor in the array. The corrected signal, i.e., the signal-of-interest, is obtained by forming a weighted sum of the individual sensor signals, i.e., $$y(t) = \Sigma w_k^* x_k(t) = w^\dagger x  \quad (2)$$

where y(t) is the corrected signal, and the $w_k$ are complex weight factors which are computed according to the present invention. Here, the superscripts "*" and "†" denote the complex-conjugate and the complex conjugate transpose, respectively, of the quantity in question. For notational convenience, the w* will be interpreted as the elements of a vector w.

In the present invention, w is calculated assuming that the signal-of-interest is either self-coherent or conjugate self-coherent. A waveform s(t) is said to be self-coherent at a frequency $\alpha$ if the cross-correlation of s(t) and s(t) frequency shifted by $\alpha$ is nonzero at some lag-time $\tau$, i.e., if $$\begin{aligned} R_{ss}^\alpha(\tau) &= <s(t + \tau/2)[s(t - \tau/2)e^{j2\pi\alpha t}]^*>_\infty \\ &= <s(t + \tau/2)s^*(t - \tau/2)e^{-j2\pi\alpha t}>_\infty \end{aligned} \quad (3)$$

is different from zero for some value of $\tau$. Here $<..>_\infty$ denotes infinite time-averaging of the quantity enclosed by the brackets. A waveform s(t) is said to be conjugate self-coherent at frequency $\alpha$ if the cross-correlation of s(t) and the complex conjugate of s(t) frequency-shifted by $\alpha$ is nonzero at some lag-time $\tau$, i.e., if $$\begin{aligned} R_{ss}^{\alpha*}(\tau) &= <s(t + \tau/2)[s^*(t - \tau/2)e^{j2\pi\alpha t}]^*>_\infty \\ &= <s(t + \tau/2)s(t - \tau/2)e^{-j2\pi\alpha t}>_\infty \end{aligned} \quad (4)$$

is different from zero for some value of $\tau$.

Self-coherence is commonly induced by periodic switching, gating, mixing, or multiplexing operations at the transmitter. For example, self-coherence is induced at multiples of the baud-rate in PCM signals and at multiples of the pilot-tone frequency in FDM-FM signals. Conjugate self-coherence is commonly induced by unbalanced in-phase and quadrature carrier modulation at the transmitter. For example, conjugate self-coherence is induced at twice the carrier frequency in DSB-AM, VSB-AM, BPSK, and unbalanced QPSK signals.

The self-coherence (or conjugate self-coherence) of a received signal is degraded if it is corrupted by additive interference which does not share that coherence. For example, a PCM signal-of-interest is corrupted at the receiver if a second PCM signal modulated at a different baud-rate is present. The present invention adapts a receiver processor such that the self-coherence (or the conjugate self-coherence) of the signal-of-interest is restored to the receiver output signal. Consequently, the acronym SCORE (for Self COherence REstoral) is used to denote the invention.

In the present invention, the weight vector w is computed so as to maximize the degree of self-coherence or conjugate self-coherence in the output signal. The goal here is to linearly combine the elements of x(t) to enhance the signal-of-interest and suppress the noise and interference received by the array. In addition, this is accomplished without using knowledge of the signal-of-interest waveform, signal-of-interest aperture vector, or interference autocorrelation matrix to calculate the linear combiner weights w. In the present invention, this is accomplished by minimizing the function, $F_{LS}$, where $$F_{LS}(w,c) = <|y(t) - u(t)|^2>  \quad (5)$$

or by maximizing the function, $F_{cross}$, where $$F_{CROSS}(w,c) = \frac{|<y(t)u^*(t)>|^2}{[<|y(t)|^2>][<|u(t)|^2>]}, \quad (6)$$

where $<..>$ denotes time-averaging and u(t), which will be referred to as the SCORE reference signal, is defined by $$u(t) = <[c^\dagger x(t - \tau)]^{(*)} e^{j2\pi\alpha t}>  \quad (7)$$

where (*) denotes optional complex-conjugation. The control parameters $\tau$ and $\alpha$ are referred to as the control delay and self-coherence frequency, respectively; the control parameter c is referred to herein as the control vector of the processor.

The control parameters (*), $\tau$, and $\alpha$ are set on the basis of the self-coherence properties of the signal being sought. In the preferred embodiment of the present invention, these parameters are set to yield a strong value of the self-coherence function (or conjugate self-coherence function) of the signal-of-interest, s(t), where the self-coherence function is given by $$|\rho_{ss}^\alpha(*)(\tau)|^2 = \frac{|<s(t + \tau/2)[s^{(*)}(t - \tau/2)e^{j2\pi\alpha t}]^*>_\infty|^2}{(<|s(t)|^2>_\infty)^2}  \quad (8)$$

Here, $<..>_\infty$ denotes infinite time-averaging and the optional conjugation *) is applied if and only if conjugate self-coherence is to be restored. Of these control parameters, only $\alpha$ and the conjugation control are crucial to the operation of the processor. Eq. (8) has been analytically evaluated for a variety of signal modulation types (see, W. A. Gardner, *Introduction to Random Processes with Applications to Signals and Systems*, Macmillan, New York, N.Y., 1985 and W. A. Gardner, *Statistical Spectral Analysis: A Nonprobabilistic Theory*, Prentice Hall, Englewood Cliffs, N.J., 1987), and for many signals of interest and appropriate values of $\alpha$ the self-coherence function has been found to be a slowly varying function with respect to $\tau$; hence there is considerable flexibility in choosing $\tau$.

The control vector c is either fixed or jointly adapted with w over the data reception time. In the following discussion, any algorithm that adapts w to minimize Eq. (5) or maximize Eq. (6) for a fixed c will be referred to as a least squares SCORE algorithm, whereas any algorithm that adapts both w and c using these equations subject to any gain constraint on w and/or c will be referred to as a cross-SCORE algorithm.

The values of w and c that optimize Eqs. (5) and (6) can be determined in terms of the estimated correlation matrices $$R_{xx} = <x(t)x^\dagger(t)> \quad (9)$$

$$R_{rr} = <r(t)r^\dagger(t)> \quad (10)$$

$$R_{xr} = <x(t)r^\dagger(t)> \quad (11)$$

$$R_{xu} = <x(t)u^*(t)> \quad (11')$$

where r(t) is referred to as the reference signal vector and is defined by $$r(t) = [x(t-\tau)](*)e^{j2\pi\alpha t} \quad (12)$$

From the above definitions, it can be shown that $$R_{xr} = R_{xx}^{\alpha}(*)(\tau) \quad (13)$$

Matrices $R_{xx}$ and $R_{rr}$ are the conventional autocorrelation matrices of x(t) and r(t), respectively. Matrix $R_{xx}^{\alpha}(*)(\tau)$ is the cyclic autocorrelation matrix or the cyclic conjugate correlation matrix of x(t), depending on whether the conjugation (*) is applied in r(t).

In terms of this notation, the w that minimizes Eq. (5) (or maximizes Eq. (6)) for fixed c is given by $$\begin{aligned} w &= g R_{xx}^{-1} R_{xu} \\ &= g R_{xx}^{-1} R_{xr} c(*), \end{aligned} \quad (14)$$

where g is an arbitrary scalar gain variable. Similarly, the w and c that jointly minimize Eq. (5) (or maximize Eq. (6)) subject to a gain constraint are given by the solutions of the eigenequations $$R_{xx} w = R_{xr} R_{rr}^{-1} R_{rx} w \quad (15)$$

$$\lambda R_{rr} c(*) = R_{rx} R_{xx}^{-1} R_{xr} c(*) \quad (16)$$

corresponding to the maximum eigenvalue, λ, of these equations. The optimal w and c can also be found by setting w using Eq. (14) and then setting c using Eq. (16), or by obtaining the solution to the joint eigenequation $$\nu \begin{bmatrix} R_{xx} & 0 \\ 0 & R_{rr} \end{bmatrix} \begin{bmatrix} w \\ c(*) \end{bmatrix} = \begin{bmatrix} 0 & R_{xr} \\ R_{rx} & 0 \end{bmatrix} \begin{bmatrix} w \\ c(*) \end{bmatrix} \quad (17)$$

corresponding to the maximum eigenvalue, ν, of this equation. An apparatus according to the present invention either approximately or exactly solves these equations using estimates of the correlation matrices $R_{xx}$ and $R_{xr}$.

It should be noted that the other eigenvalues obtained from Eq. (17) provide useful information. If several signals that are self-coherent (or conjugate self-coherent) at α are present, multiple solutions to this eigen equation will be found. Each of the solutions adapts the processor to receive one of these signals if the self-coherence functions of these signals are distinct, when evaluated at the chosen control parameters (*), α, τ.

An extension of the cross-SCORE algorithm is obtained by generalizing the reference signal vector r(t) according to $$r(t) = [h(t) \bullet x(t)](*)e^{j2\pi\alpha t} \quad (18)$$

where h(t) is a general scalar linear time-invariant filter impulse response, and ● denotes the convolution operation. This filter will be referred to as the control filter. The reference signal vector defined in Eq. (12) utilizes a filter that is a delay. Algorithms employing a control filter with an impulse response that is different from a simple time delay are referred to hereinafter as generalized cross-SCORE algorithms. This generalization does not affect the mathematical form of the cross-SCORE algorithm; however, it does affect the implementation of the cross-SCORE algorithm. If the control filter is chosen to be a delay, then $R_{rr}$ can be replaced with $R_{xx}$ in Eqs. (15)–(17), thereby considerably reducing the computational complexity of the cross-SCORE apparatus. The complexity of the control filter will also strongly affect the complexity of the overall cross-SCORE apparatus, since the filter must process the individual elements of x(t). However, the convergence time of the apparatus can be improved by matching h(t) to the self-coherence properties of the signal-of-interest s(t) in the environment. That is, h(t) should be chosen to maximize $$|\rho_{\hat{s}s}^{\alpha}(*)(\tau)|^2 = \frac{|<\hat{s}(t + \tau/2)[\hat{s}(*)](t - \tau/2)e^{j2\pi\alpha\tau}]^*>_\infty|^2}{<|\hat{s}(t)|^2>_\infty <|s(t)|^2>_\infty} \quad (19)$$

where $$\hat{s}(t) = h(t)s(t) \quad (20)$$

In summary, the method of this embodiment comprises the following steps:
1. Using an analog or digital measurement of the complex data x(t) from a set of sensor elements, compute the $R_{xx}$ using Eq. (9). This can be accomplished by updating $R_{xx}$ after each new measurement of x(t).
2. Form r(t) from x(t) using Eq. (12) or (18) and compute $R_{rr}$ and $R_{xr}$ using Eqs. (10) and (11).
3. If the cross-SCORE algorithm is being implemented, update c(*) by exactly or approximately solving Eq. (16).
4. Update w using Eq. (14), and form the array output signal using Eq. (2).

The various correlation matrices which consist of the average values of products of the components of x(t) and r(t) may be calculated by recursively updating the matrices after each new measurement of x(t). Algorithms for such recursive updating are well known in the processing arts (See, P. E. Mantey and L. J. Griffiths, "Iterative Least-Squares Algorithms for Signal Extraction", Second Hawaii Conference on Systems Science, January 1969, pp. 767–770, or R. A. Monzingo, T. W. Miller, Introduction to Adaptive Arrays, John Wiley and Sons, N.Y., N.Y., 1980).

Additional information may be obtained from the parameters obtained in the above described procedure. For example, the maximum eigenvalue obtained from the cross-SCORE procedure can be used to detect or recognize the presence of the signal-of-interest in the received environment. The phase angle of the complex inner product of the processor and control vectors, w and c, can be used to estimate the signal carrier/clock phase. In addition, the array aperture estimate, $R_{xx}w$, can be used to estimate additional parameters such as the polarization of the signal-of-interest or the direction of arrival of the signal-of-interest. The direction of arrival information requires calibration data or a special array geometry for the array in question.

Having described the method by which the values of w and c are generated, a more detailed description of an apparatus according to the present invention will now be given. The apparatus of the present invention will be referred to hereinafter as a SCORE processor. FIG. 1(a) illustrates a receiver front-end which might be used to provide the inputs, x(t), required by the SCORE processor when said processor is used with an antenna array comprised of antennae 26. To simplify FIG. 1 only two signals, I(t) and S(t), are shown impinging on the antenna array. S(t) is the signal-of-interest, and I(t) represents an interfering signal. The directions of incidence of these signals are indicated by arrows 22 and 24, respectively. Each antenna 26 of the array is connected to a receiver circuit 28. The receiver circuits also introduce noise signals 27.

Figure 1A:
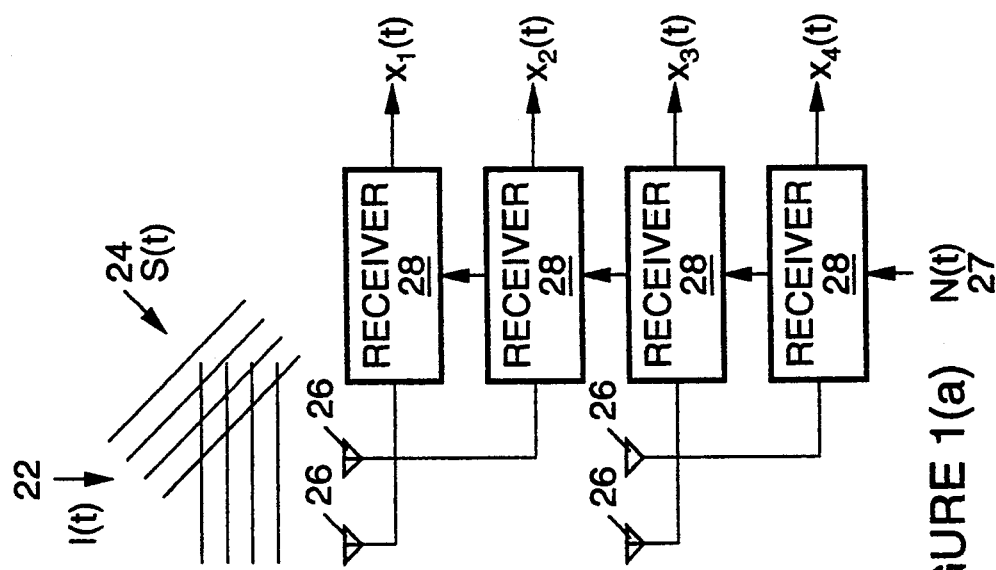
FIG. 1(a) is a block diagram of a receiver front-end that can be used with the present invention.

The preferred embodiment of a receiver circuit 28 is shown in FIG. 1(b). The signal 29 from the antenna connected to said receiver circuit is split into two signals on lines 30 and 32. These signals are downconverted to baseband or an intermediate frequency (IF) utilizing a local oscillator 34. The downconverted sensor output signals are converted to a complex representation by a separate conversion of inphase and quadrature components utilizing phase shifter 35 which shifts the local oscillator signal by 90 degrees prior to mixing by mixer 31. Mixer 33 is used to produce the in-phase component of the signal. Each component is passed through a low pass filter 40. To simplify the drawings, only one signal line will be shown for each component $x_k(t)$ of x(t); however, it is to be understood that each such signal line consists of two lines, one carrying the real component, R, and one carrying the imaginary component, J.

Figure 2:
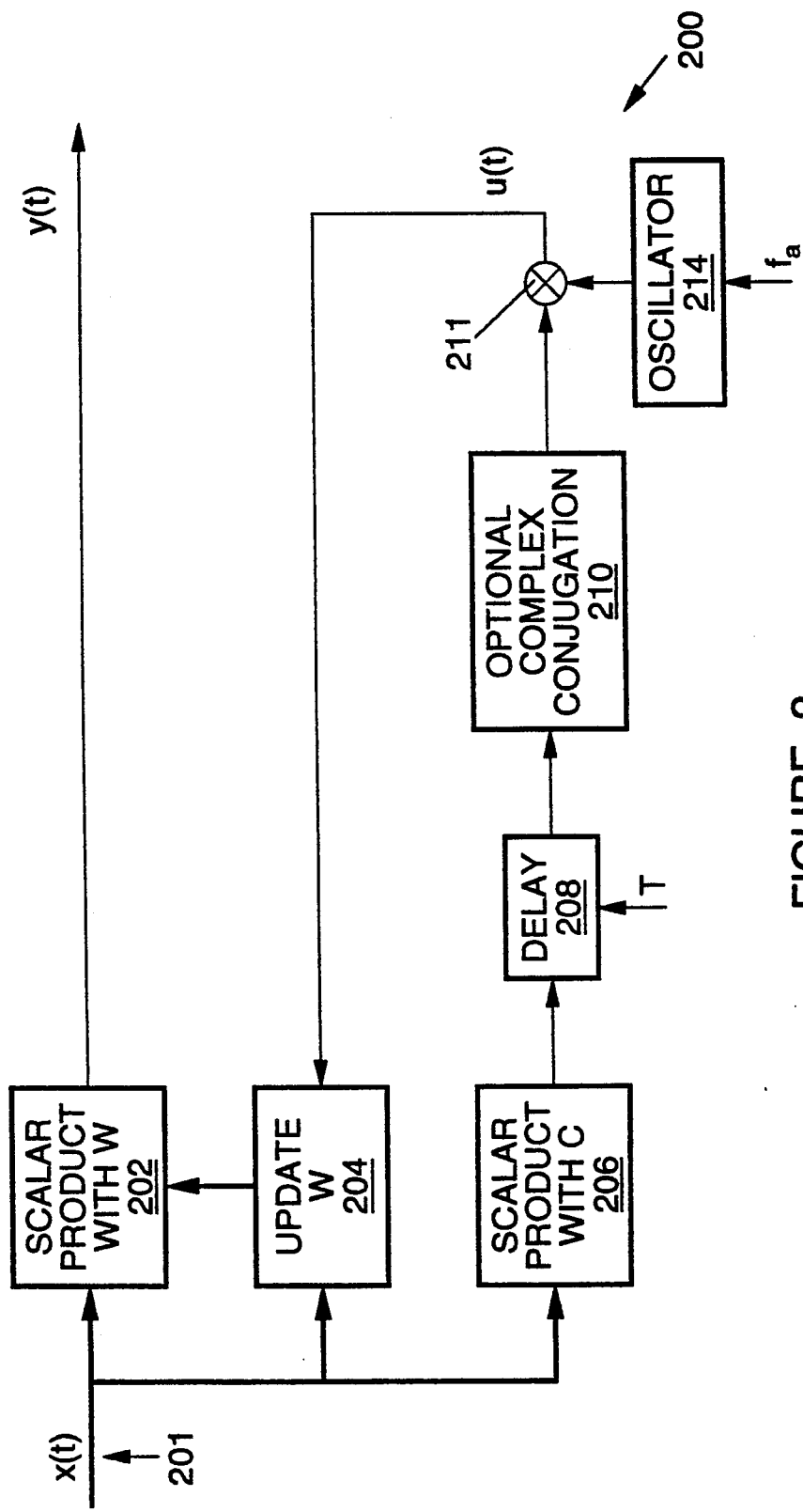
FIG. 2 is a block diagram of one embodiment of a processor according to the present invention.

FIG. 2 illustrates the preferred embodiment of a least-squares SCORE processor 200. The x(t) signal from the receiver front-end is fed to a scalar product circuit 202 which calculates the scalar product of x(t) and w to form the output signal y(t). To clarify FIG. 2 and the following drawings, those signal paths that carry a vector or matrix are shown in bold. It is assumed that x(t) has not been digitized, i.e., it is still in analog form. Scalar product circuits are known to the prior art; hence, the details of scalar product circuit 202 will not be given here. For the purposes of this discussion, it is sufficient to note that scalar product circuit 202 may be constructed from a plurality of operational amplifiers whose gains are controlled by the values of the components of w. The outputs of these amplifiers are combined using summing amplifiers to form y(t).

The values of w are calculated by minimizing the Least Squares function given in Eq. (5). The steering signal, u(t), is calculated in analog form by circuit elements 206, 208, 210, 211, and 214 as follows. A scalar signal is created by computing the scalar product of x(t) and c in scalar product circuit 206. The output of this circuit is delayed by a time T by delay circuit 208. Here T is set to the desired value of $\tau$. If w is to be updated on the basis of conjugate self-coherence, the delayed signal is then replaced by the complex conjugate thereof by circuit 210. If conjugate self-coherence is not being used, circuit 210 merely reproduces the input signal at its output. Finally, the output of circuit 210 is frequency shifted by multiplying the signal by $e^{j2\pi\alpha t}$ utilizing a local oscillator 214 whose frequency $f_a$ has been set equal to $\alpha$. This multiplication is performed by mixing circuit 211. Update circuit 204 calculates the value w that minimizes the time average of the squared error $|y(t)-u(t)|^2$.

Figure 3:
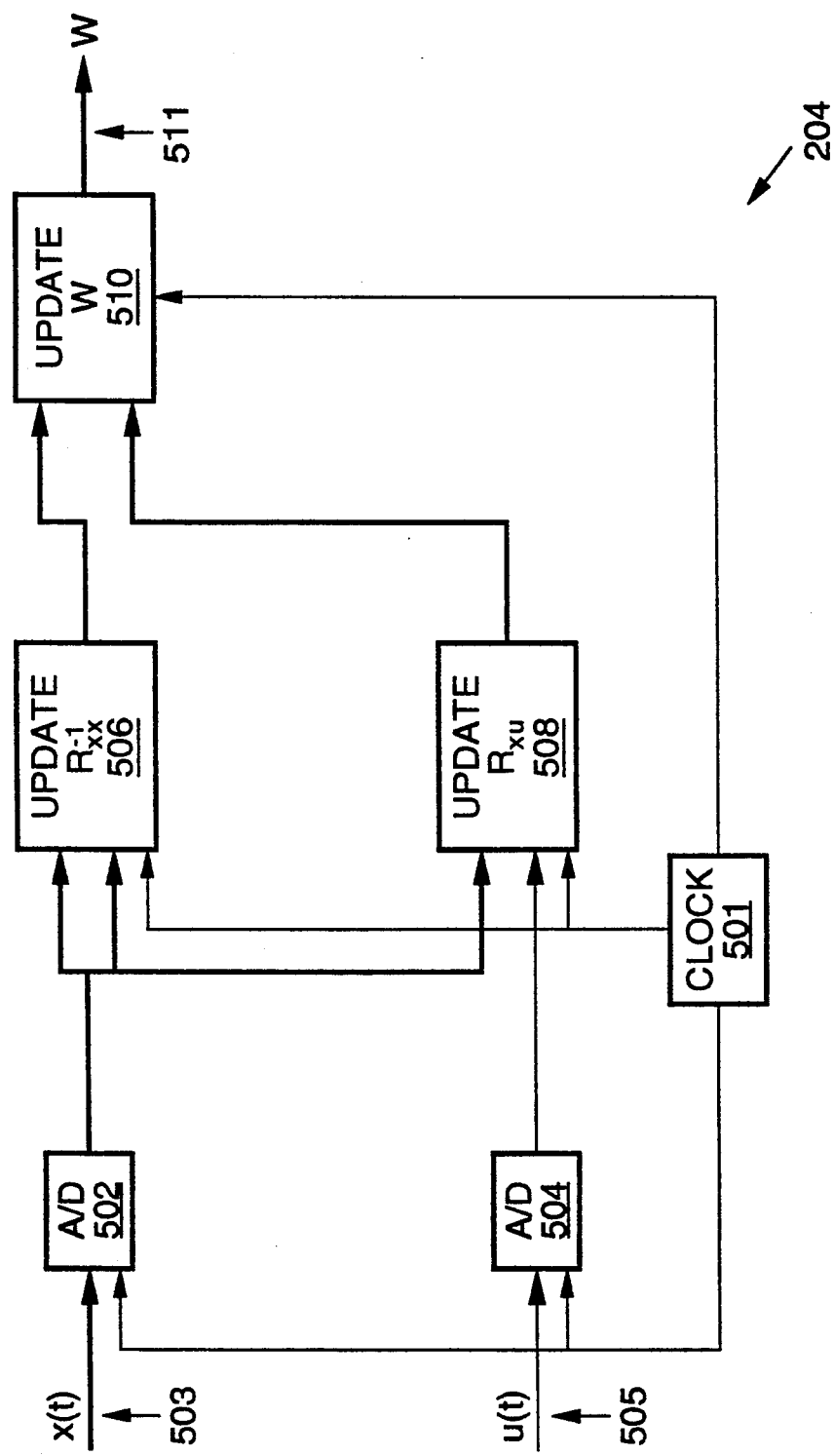
FIG. 3 is a block diagram of the preferred embodiment of an update circuit shown in FIG. 2.

The preferred embodiment of update circuit 204 is shown in FIG. 3. Update circuit 204 utilizes the first relationship in Eq. (14) to calculate the value of w that minimizes $F_{LS}$. The value of w is calculated on a recursive basis under the control of a clock 501. During each clock cycle, the values of the components of x(t) are digitized by a bank of A/D converters 502. These values are fed to an update circuit 506 which updates the values in $R_{xx}^{-1}$, preferably utilizing an algorithm such as that of Woodward for updating an inverse of a correlation matrix. Circuits for updating the inverse of a correlation matrix are well known in the signal processing arts and hence will not be described in detail here. For the purposes of this discussion, it is sufficient to note that update circuit 506 typically comprises a bank of multiply and accumulate circuits. Each such circuit calculates the product of two components of vector x(t) and accumulates the results so as to form the appropriate time averages.

Similarly, A/D converter 504 digitizes u(t) and outputs the digitized result to update circuit 508 which updates the average of $R_{xu}$. The updated values calculated by update circuits 506 and 505 are then used to calculate a new value for w by update circuit 510 which performs the multiplications given in Eq. (14) above.

Update circuit 204 is preferably a three stage pipeline processor. At each clock cycle, the current values of x(t) and u(t) are digitized by circuits 502 and 504. The values so digitized one cycle earlier are used to update $R_{xx}^{-1}$ and $R_{xu}$. The values of $R_{xx}^{-1}$ and $R_{xu}$ calculated one cycle earlier, i.e., based on the digitized values of x and u two cycles earlier, are then used to update w which is outputted on bus 511.

The value of the gain constant, g, shown in Eq. (14) is preferably chosen so as to prevent overflows or underflows in the various calculational elements of update circuit 204.

SCORE processor 200 does not determine the values of the various components of the control vector c; hence these values must be provided. If calibration data is available for the antenna array and if the direction of incidence of the signal-of-interest is also known, then c can be chosen so as to beamform in the direction of incidence of the signal-of-interest. If such data is not available, c is preferably chosen to provide an isotropic response for the antenna array.

Figure 4:
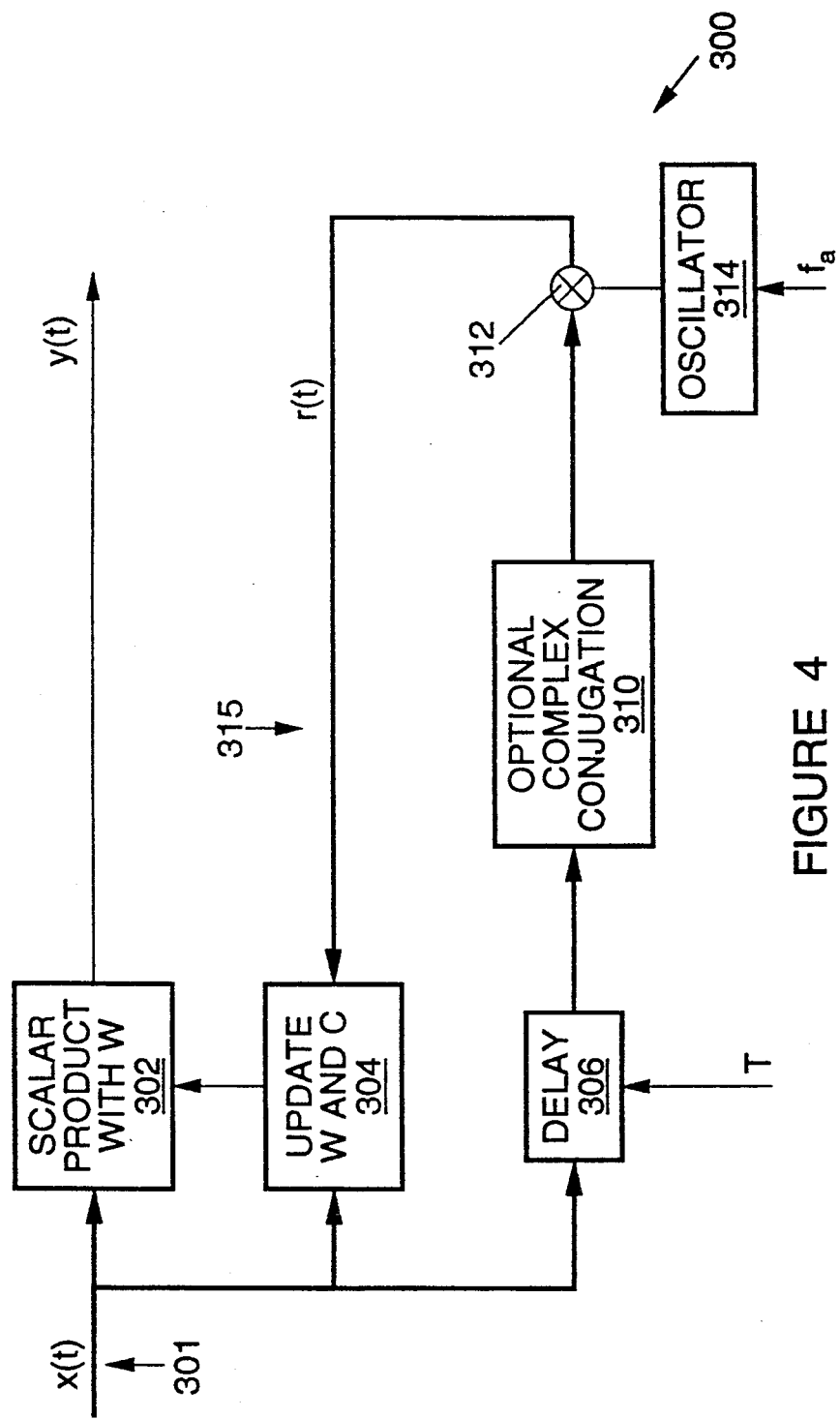
FIG. 4 is a block diagram of a second embodiment of the present invention.

However, if the proper values for c are not known, it is preferred that both w and c be simultaneously optimized, i.e., that a cross-SCORE processor be used. A block diagram of such a processor is shown at 300 in FIG. 4. In a manner similar to that described above with reference to SCORE processor 200, the scalar product of the vector input x(t) received on bus 301 and w is calculated by scalar product circuit 302 to form the output signal y(t). The vector input x(t) is also used to construct the vector r(t) given in Eq. (12) above using circuits 306, 310, 312, and 314. Delay circuit 306 delays each component of x(t) by a time, T, Which is set equal to $\tau$. If w and c are being chosen using the conjugate self-coherence formulas, then each component of the delayed signal is replaced by its complex conjugate by circuit 310. Finally, each component of the output of circuit 310 is multiplied by $e^{j2\pi\alpha t}$ by mixing the output with a signal from a local oscillator 314 whose frequency $f_\alpha$ has been set equal to $\alpha$. This mixing operation is performed by circuit 312.

Figure 5:
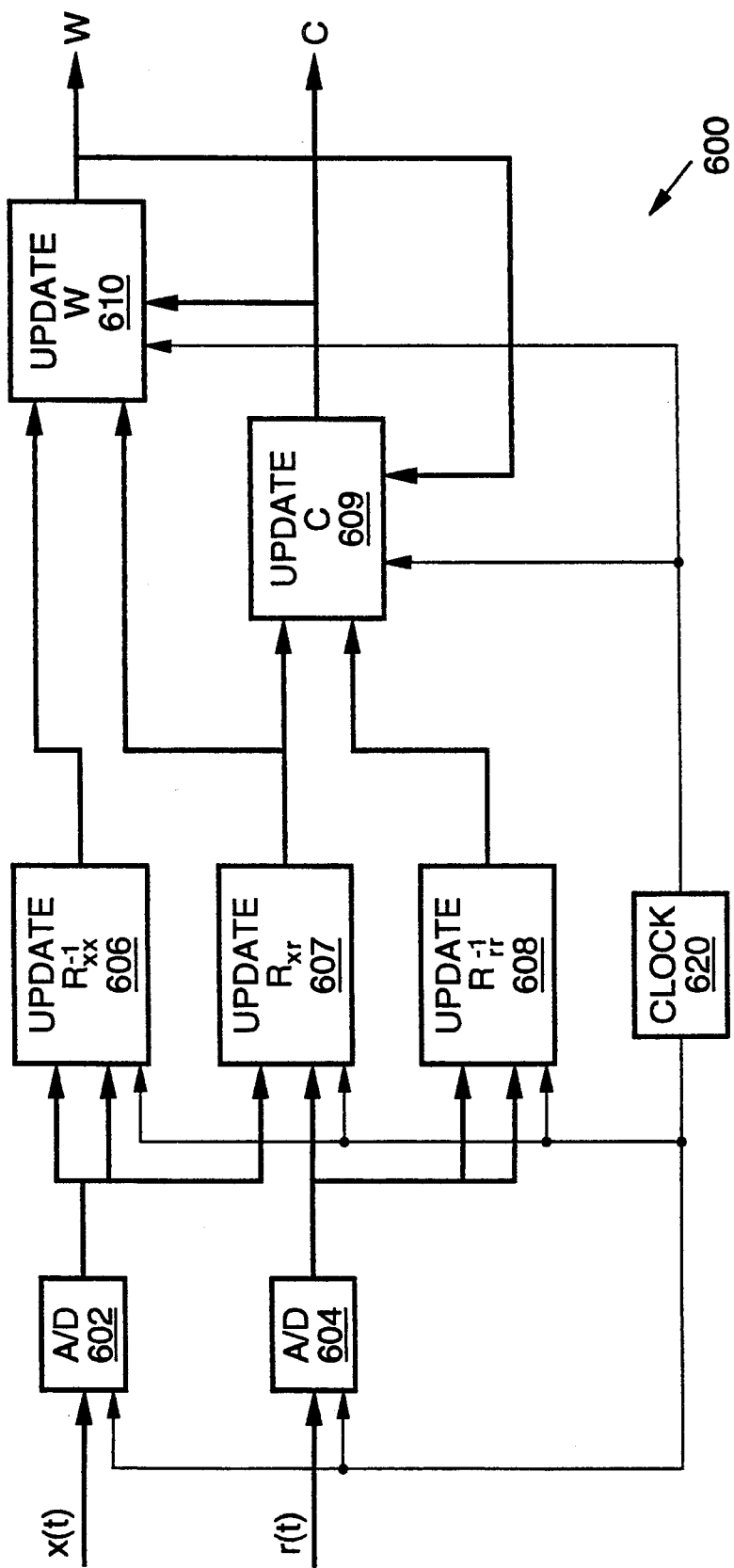
FIG. 5 is a block diagram of the preferred embodiment of an update circuit shown in FIG. 4.

The resulting signal, r(t), is inputted to an update circuit 304 via bus 315. Update circuit 304 also receives x(t) as one of its inputs. The preferred embodiment of update circuit 304 is shown in FIG. 5 at 600. Referring to FIG. 5, the measured values of x(t) are inputted to a bank of A/D converts 602 which digitize x(t). Similarly, the components of r(t) are digitized by a bank of A/D converters 604. The digitized values of the components of x(t) and r(t) are inputted to circuits 606–608 which are used to update the values of the correlation matrices given in Eqs. (9)–(11) or the appropriate inverses thereof. In the preferred embodiment, w is updated using Eq. (14) by update circuit 610. Then c is updated using the new value of w and Eq. (16) by update circuit 609. However, as noted above, there are several algorithms that may be used to find the values of w and c that optimize Eqs. (5) and (6). Hence, it will be obvious to those skilled in the art that update circuits 609 and 610 may be replaced by other processing means that calculate the solution to one of the above described equations.

In the preferred embodiment, update circuit 600 is a four stage pipeline processor which is timed by clock 620. In each clock cycle, the current values of x(t) and r(t) are calculated by A/D banks 602 and 604. The values calculated by these banks in the previous clock cycle are used by update circuits 606–608 to update the various matrices used to calculate new values for w and c. The values of these matrices calculated in the previous cycle, i.e., based on x(t) and r(t) values digitized two cycles earlier, are used in conjunction with the previous value of w to update c. Finally, the new value of c is used in conjunction with these matrices to calculate a new value for w.

Although the present invention has been described with reference to certain specific algorithms for optimizing Eqs. (5) and (6), it will be apparent to those skilled in the art that other methods of optimizing these equations may be utilized. For example, the signals u(t) and y(t) generated in FIG. 2 may be inputted to a processor that searches for the values of w and/or c that minimize the time average of the square of the absolute value of the difference of u(t) and y(t), subject to an equality constraint on either $<|u(t)|^2>$ or $<|y(t)|^2>$ (which can be interpreted as a weighted-norm constraint on either c or w, without using the matrices described above). Algorithms that find the constrained minimum of an arbitrary function of one or more variables are well known to those skilled in the signal processing and mathematical arts.

In this regard, it should be noted that signal processors that calculate the value of w so as to maximize an objective function are known to the prior art. The present invention differs from such processors in the manner in which the reference signal, i.e., u(t) or r(t), is obtained. In the present invention, a reference signal that depends on the measured signal x(t) frequency shifted by $\alpha$ is used to generate the processor weight vector w. The processor weight vector is calculated such that the self-coherence (or conjugate self-coherence) of the output signal, y(t), is greater than the self-coherence (or conjugate self-coherence) of the input signals, $x_k(t)$, that makeup the input signal vector x(t). In the above examples, w is calculated so as to maximize the self-coherence (or conjugate self-coherence) of the output signal.

Figure 6:
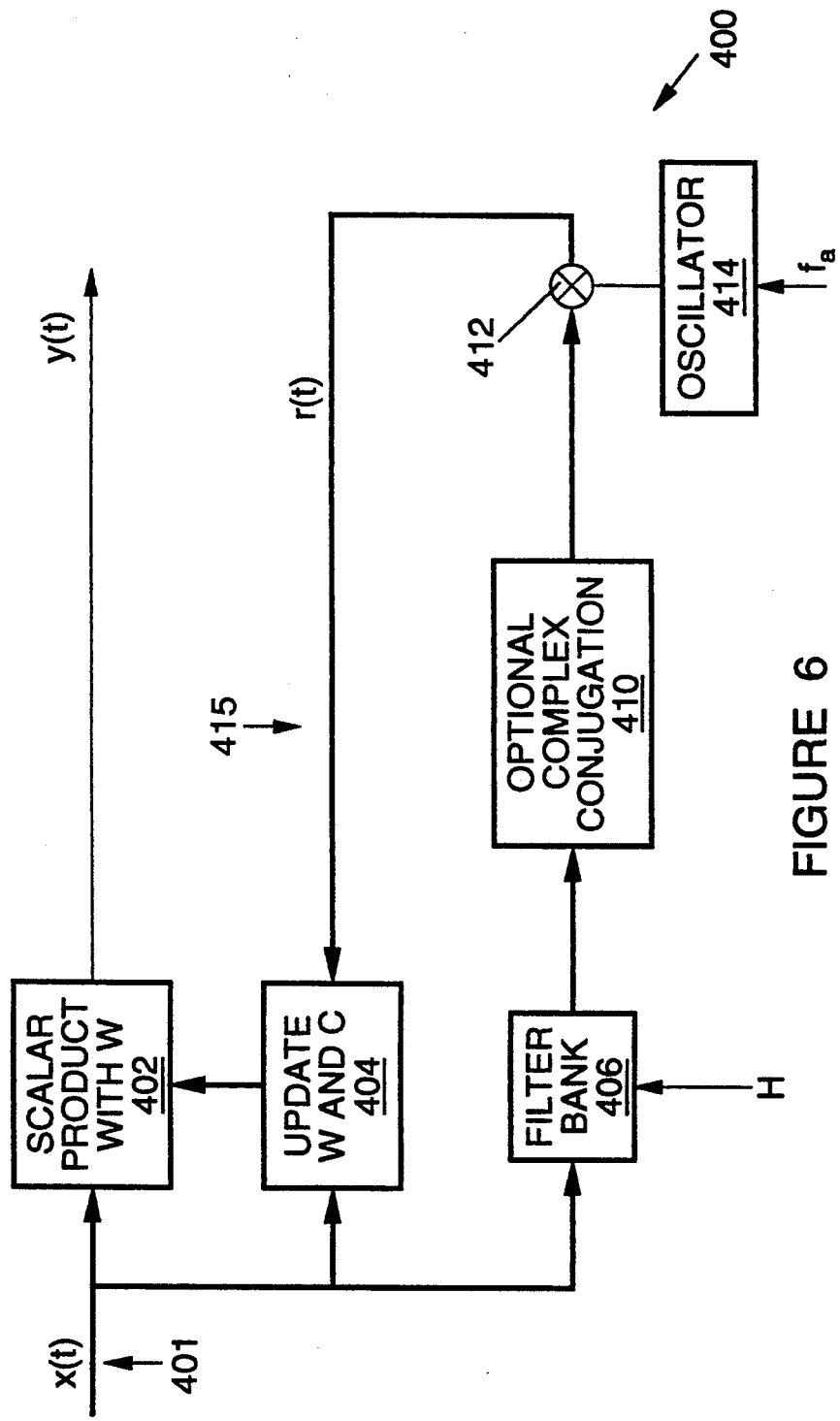
FIG. 6 is a block diagram of the preferred embodiment of the present invention.

In the examples discussed above, the reference signal depends on the measured signal delayed by $\tau$. As noted above with reference to Eq. (18), a more generalized form of reference signal may be generated by first filtering x t) and then frequency shifting the filtered signal to produce the reference signal. The delay used in the above described embodiments of the present invention is merely one case of a "filter". FIG. 6 illustrates a more general SCORE processor 400 that utilizes such a filter. Generalized-SCORE processor 400 constructs the output signal y(t) by taking the scalar product of x(t) is which inputted on bus 401 and a vector w utilizing circuit 402 which operates in a manner analogous to that described with reference to previously described embodiments of the present invention.

The processor vector w is calculated so as to optimize Eqs. (5) or (6). The reference signal r(t) is generated by filtering x(t) using filter bank 406. In the preferred embodiment of the present invention, the same filter is applied to each component of x(t); however, embodiments in which different filters are applied to different components of x(t) will be apparent to those skilled in the art of signal processing. If conjugate self-coherence is being optimized, the filtered signals are conjugated by circuit 410, otherwise circuit 410 merely copies the filtered signals to mixer 412 which shifts the frequency of the filtered signals by $f_\alpha(=\alpha)$ to generate r(t) which is inputted to update circuit 404 on bus 415. Update circuit 404 calculates new values for c and w such that self-coherence (or conjugate self-coherence) with a delay of zero is maximized. Update circuit 404 can utilize any one of the approaches discussed above with reference to Eqs. (9)–(17) with r(t) from Eq. (18) instead of the r(t) defined in Eq.(12).

Phase SCORE Extraction

As stated above, each of the Least-Squares SCORE algorithm and the Cross-SCORE algorithm maximizes the objective function $F_{cross}$ (Eq. 6). Furthermore, as stated in reference to Eq. (17), each solution to the cross-SCORE eigenvalue equation adapts the processor to receive one of the signals that are self-coherent (or conjugate self-coherent) at the chosen $\alpha$. However, as stated, such adaptation occurs only if the self-coherence functions of these signals are distinct when evaluated at the chosen control parameters (*), $\alpha$, and $\tau$. This required condition does not hold when two or more signals having the same non-zero self-coherence at (*), $\alpha$ and $\tau$ impinge on the array, regardless of the time-difference of arrival (TDOA) between the signals.

The TDOA affects the complex phase of the complex-valued self-coherence function $$\rho_{ss}^\alpha(\tau) = \frac{<s(t+\tau/2)s^*(t-\tau/2)e^{-j2\pi\alpha t}>_\infty}{<|s(t)|^2>_\infty} \quad (21)$$

However, although it is not obvious that $F_{cross}$ destroys the phase information of the Eq. (21), it is possible (but very difficult) to show that this is indeed the case. See "Spectral Self-coherence Restoral: A New Approach to Blind Adaptive Signal Extraction Using Antenna Arrays", B. G. Agee, S. V. Schell, and W. A. Gardner, to appear in *Proceedings of the IEEE*, April 1990. Some insight can be obtained by examining Eq. (15) wherein the matrix product $R_{xr}R_{rr}^{-1}R_{rx}$ is used to find w. Since $R_{xr}$ and its conjugate transpose $R_{rx}$ individually contain phase information related to Eq. (21), forming their product destroys that information in the same way that the product of a complex scalar and its conjugate contains no phase information of the original scalar.

An algorithm that is similar to the cross-SCORE algorithm but that preserves this phase information, thereby extending applicability, is described here and is correspondingly referred to as the phase-SCORE algorithm. The phase-SCORE algorithm uses the same correlation matrices as the cross-SCORE algorithm but uses them differently. Each solution w to the phase-SCORE algorithm is given by a solution of the eigenvalue equation $$\lambda R_{xx} w = R_{xr} w \quad (22)$$

for which the eigenvalue $\lambda$ is non-negligible. This eigenequation can be obtained by replacing $c^{(*)}$ with w in Eq. (14). Loosely, the phase-SCORE algorithm (22) can be thought of as the cross-SCORE processor, Eq. (15), after omitting the product $R_{rr}^{-1} R_{rx}$ from the full product $R_{xr} R_{rr}^{-1} R_{rx}$. Since $R_{xr}$ contains phase information related to Eq. (21), and that information is not destroyed by multiplying $R_{xr}$ by its conjugate transpose, then the phase-SCORE algorithm is able to retain the phase information related to Eq. (21) and exploit it to advantage.

If several signals that are self-coherent at $\alpha$ are present, then each of the non-negligible eigenvalues of Eq. (22) provides useful information. Each of the solutions adapts the processor to receive one of these signals if the complex-valued self-coherence functions of these signals are distinct when evaluated at the chosen control parameters (*), $\alpha$, and $\tau$. In practice, this condition is much more likely to hold than the corresponding condition for the cross-SCORE solutions. For example, a commercial PCM communication signal is usually bandlimited to one bandwidth of a small set of bandwidths agreed upon as part of a standard. Thus, it is quite possible that two PCM signals having the same baud rate also have the same bandwidth and thus have the same value of self-coherence. However, it is very unlikely that this condition holds and also that the two signals have the same TDOA or relative pulse timing, and thus it is very unlikely that two PCM signals have the same complex-valued self-coherence.

An apparatus of the prior embodiment which is similar to the apparatus that solves the cross-SCORE eigenvalue Eq. (15) for multiple solutions either approximately or exactly solves the phase-SCORE eigenvalue equation using estimates of the correlation matrices $R_{xx}$ and $R_{xr}$.

Just as the cross-SCORE algorithm in the prior embodiment can be generalized by obtaining the reference signal vector r(t) as a filtered and frequency-shifted version of x(t) according to Eq. (18), so, too, can the phase-SCORE algorithm be generalized in an identical manner. Likewise this generalization does not affect the mathematical form of the phase-SCORE algorithm. Moreover, unlike the case for the cross-SCORE algorithm, the actual choice of filter h(t) does not affect the computational complexity of the phase-SCORE apparatus, except insofar as the filter must process the individual elements of x(t). Therefore, except for this last factor, no computational penalty in the phase-SCORE algorithm is assessed for using an optimally chosen filter h(t) instead of a simple delay.

In summary, the method of this embodiment referred to as the phase-SCORE algorithm comprises the following steps:

1. Using an analog or digital measurement of the complex data x(t) from a set of sensor elements, compute the $R_{xx}$ matrix using Eq. (9). This can be accomplished by updating $R_{xx}$ after each new measurement of x(t).
2. Form r(t) from x(t) using Eq. (12) or (18), and compute $R_{xr}$ using Eq. (11).
3. Update w by solving Eq. (22) and form the array output signal using Eq. (2).

The formulas in the prior embodiment apply to the present embodiment. In the present embodiment, Eq. (22) replaces Eq. (15) to obtain each solution for the linear combining weight w. Thus, all the circuits in the prior embodiment can be used in the present embodiment, except that the present embodiment needs a circuit to obtain the linear combining weight w by solving the Eq. (22).

Figure 7A:
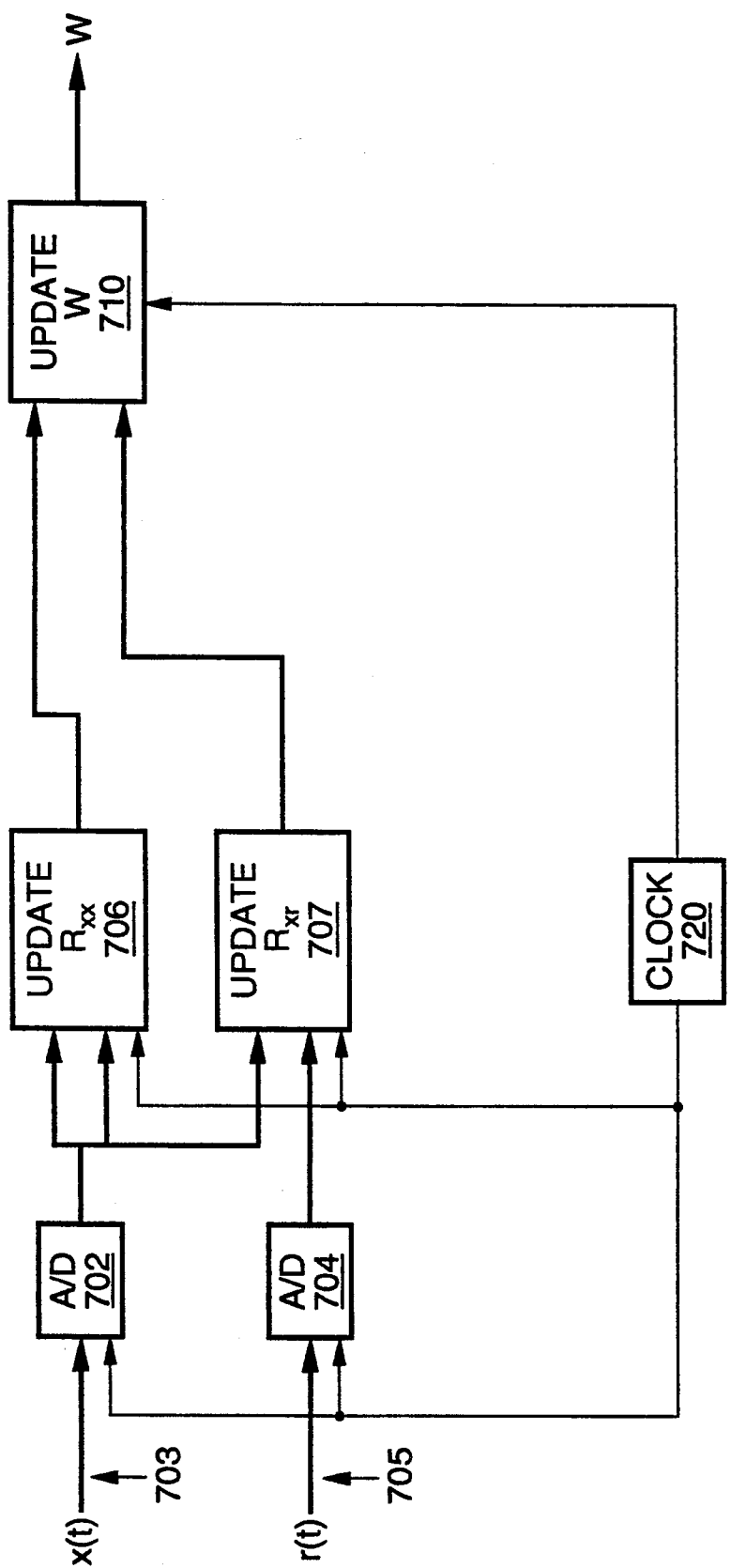
FIG. 7A is a block diagram of a phase-SCORE processor for signal extraction, according to the present invention.

FIG. 7A depicts a phase-SCORE processor including a mechanism for preserving phase information, according to the present invention. As such, the structure of proposed FIG. 7A is similar to the cross-SCORE processor embodiment depicted in FIG. 5. The difference between FIG. 5 and FIG. 7A, however, is that the $R_{xx}^{-1}$ block 606 shown in FIG. 5 is changed to the $R_{xx}$ block 706 shown in FIG. 7A. Function blocks 706, 707 and 710 in FIG. 7A perform a preserving phase information function.

Estimation of DOA

The phase-SCORE algorithm discussed above performs signal selective signal extraction; that is, only those signals that have spectral self-coherence at the chosen cycle frequency, $\alpha$, are considered to be signals of interest, and all other signals are ignored or rejected. This signal selectivity is also useful for estimation of direction-of-arrival (DOA), and circumvents the major limitations in the conventional MUSIC algorithm for estimation of DOA, many of which are also shared by almost all other existing DOA estimation algorithms.

The algorithms used in this DOA-estimation embodiment include the phase-SCORE algorithm, a closely related alternative algorithm called cyclic MUSIC, and a third related algorithm called Cyclic Least Squares. Although Cyclic Least Squares does not bear a resemblance to the other two algorithms in terms of its algorithmic implementation, its conceptual basis is similar.

The Cyclic MUSIC algorithm performs signal selective DOA estimation, but unlike phase-SCORE it does not perform signal extraction. However, it possesses a slightly simpler implementation than does the phase-SCORE algorithm.

The Cyclic Least Squares algorithm also performs signal selective DOA estimation as well as signal extraction and like the phase-SCORE and Cyclic MUSIC algorithms, exploits the spectral self-coherence properties of the signals of interest. However, it does not bear any real algorithmic resemblance to phase-SCORE or Cyclic MUSIC. However, a heuristic interpretation (to be stated later) reveals much similarity between this approach and the phase-SCORE and Cyclic MUSIC approaches.

These inventions may be collectively referred to as the SCORE direction (or DOA) estimation inventions because they exploit the spectral self-coherence of the desired signals and are closely linked to the self-coherence-restoral eigenvalue equations. The SCORE DOA estimation algorithms have the following advantages: (1) only those signals having spectral self-coherence at the chosen value of the cycle frequency $\alpha$ are selected for DOA estimation by the algorithms; (2) knowledge of the noise and interference autocorrelation matrices is not required; (3) an arbitrary number of arbitrarily closely spaced interferers can be present; (4) the Cyclic Least Squares algorithm can operate effectively in the presence of perfectly correlated signals; and (5) the only requirement is that the number, d, of signals spectrally self-coherent at the chosen $\alpha$ be less than the number of sensors M.

The phase-SCORE algorithm for DOA estimation is an extension of the phase-SCORE algorithm for signal extraction in the following way. The phase-SCORE eigenequation (Eq. 22) is solved for each of the eigenvectors w, having negligible eigenvalue $\lambda$. That is, the phase-SCORE algorithm for DOA estimation uses the solutions not used by the phase-SCORE signal extraction algorithm. The corresponding eigenvectors form the columns of a matrix $E_N$, referred to as the generalized null space of the matrix pair $(R_{xr}, R_{xx})$ in Eq. (22), $$E_N = [w_{d+1} \, w_{d+2} \cdots w_M], \quad (23)$$

where the following equation holds for $i = 1, \ldots, M$, M being the number of sensors, $$\lambda_i R_{xx} w_i = R_{xr} w_i, \quad (24)$$

where $w_i$ is the ith eigenvector and the eigenvalues $\lambda_{d+1}, \ldots, \lambda_M$ are negligibly small compared with $\lambda_1, \ldots, \lambda_d$, d being determined from this partitioning of the eigenvalues. The generalized null space $E_N$ is then used to form the measure of orthogonality, $P_1(\theta)$, $$P_1(\theta) = ||E_N^\dagger a(\theta)||^{-2}, \quad (25)$$

where $(\ )^\dagger$ denotes the Hermitian or conjugate transpose operation, $\theta$ is the DOA estimation parameter, and $a(\theta)$ is the corresponding direction vector obtained from the calibration data for the array. The measure $P(\theta)$ is searched for peaks, or local maxima: the number of peaks is equal to the number of desired signals, d, and the location of each peak is the DOA of a desired signal.

Figure 7B:
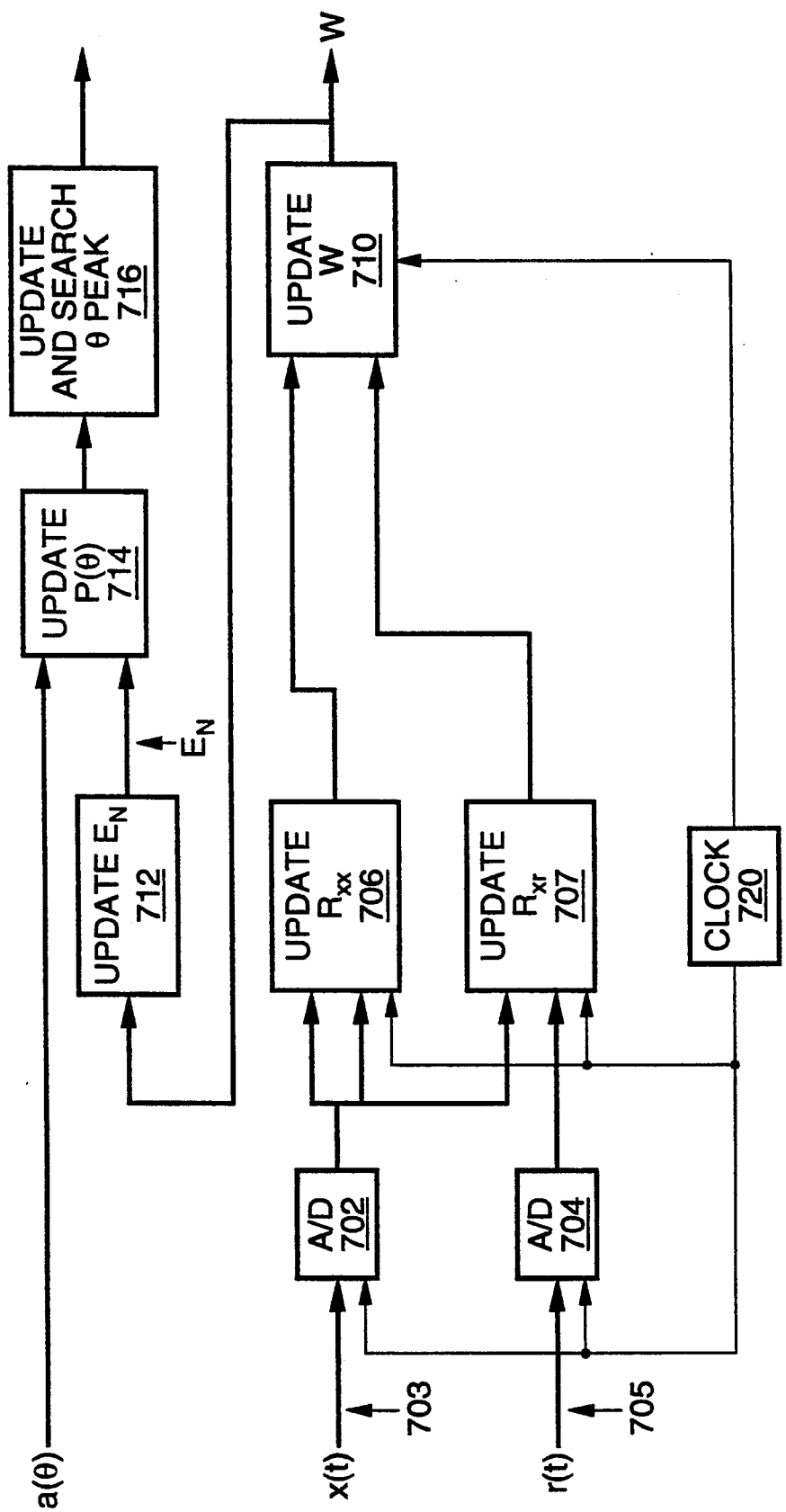
FIGS. 7B and 7C are block diagram of a phase-SCORE processor for direction of arrival ("DOA") estimation, according to the present invention.
Figure 7C:
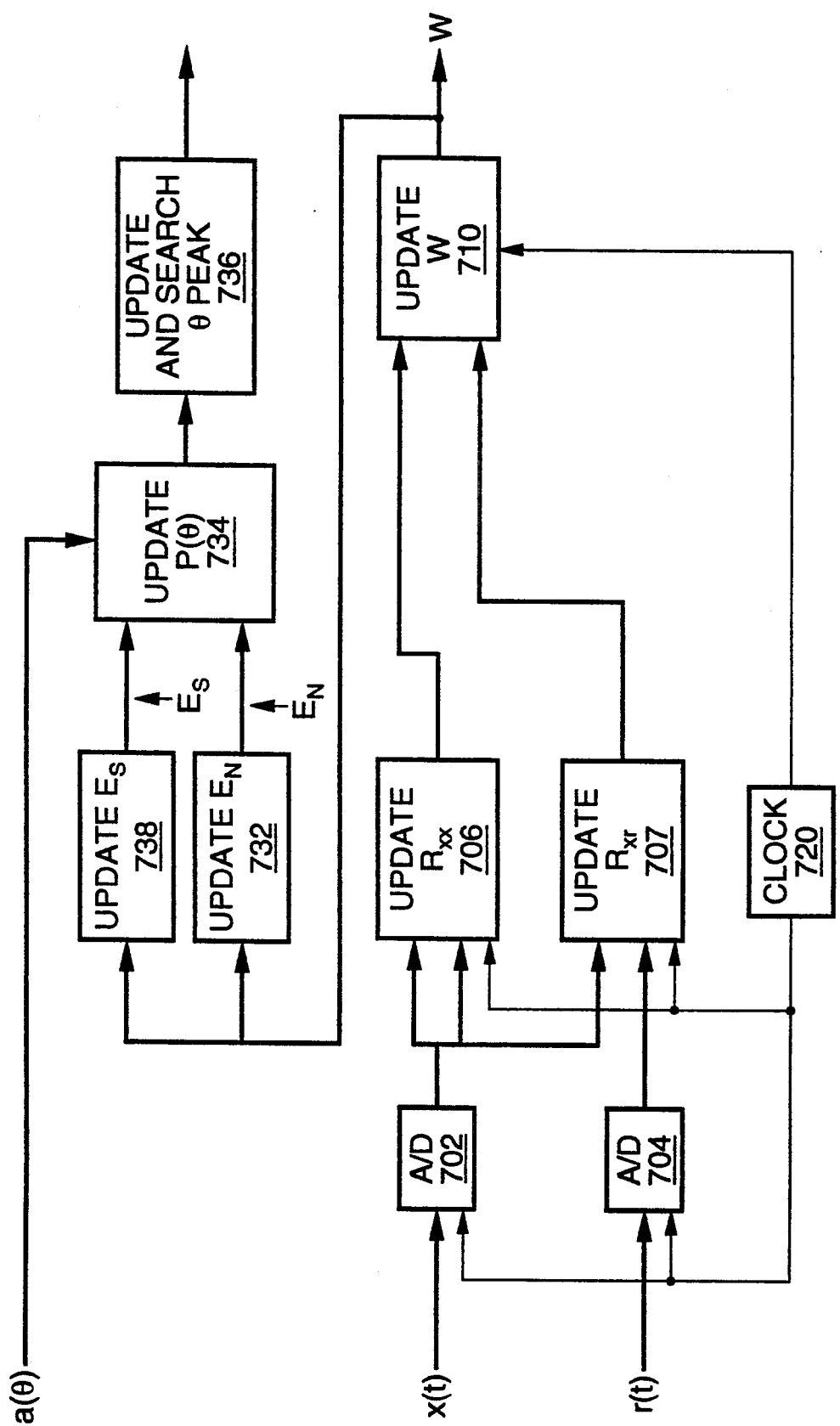
Figure 7D:
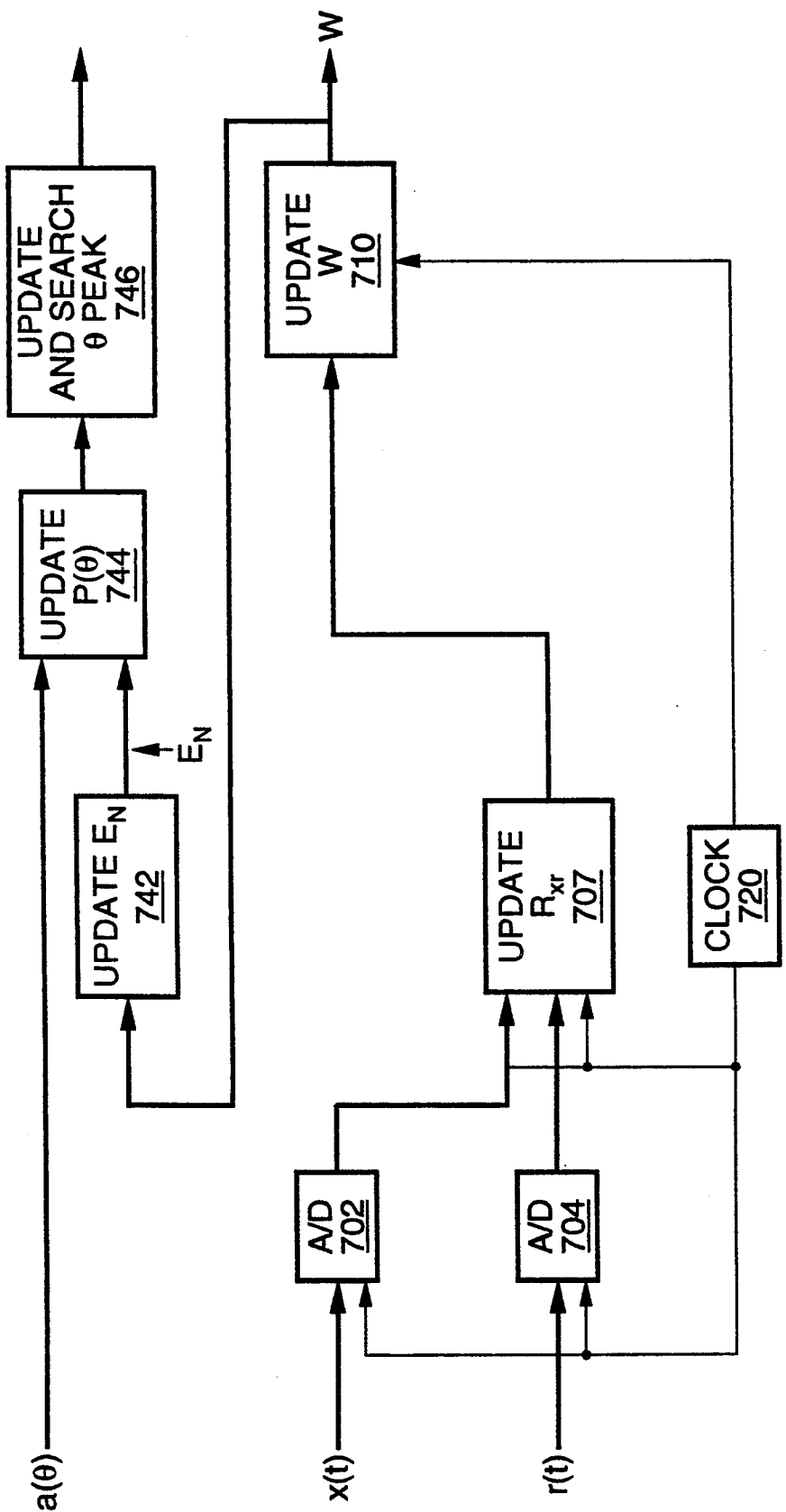
FIG. 7D is a block diagram of a Cyclic MUSIC processor for direction of arrival ("DOA") estimation, according to the present invention.
Figure 7E:
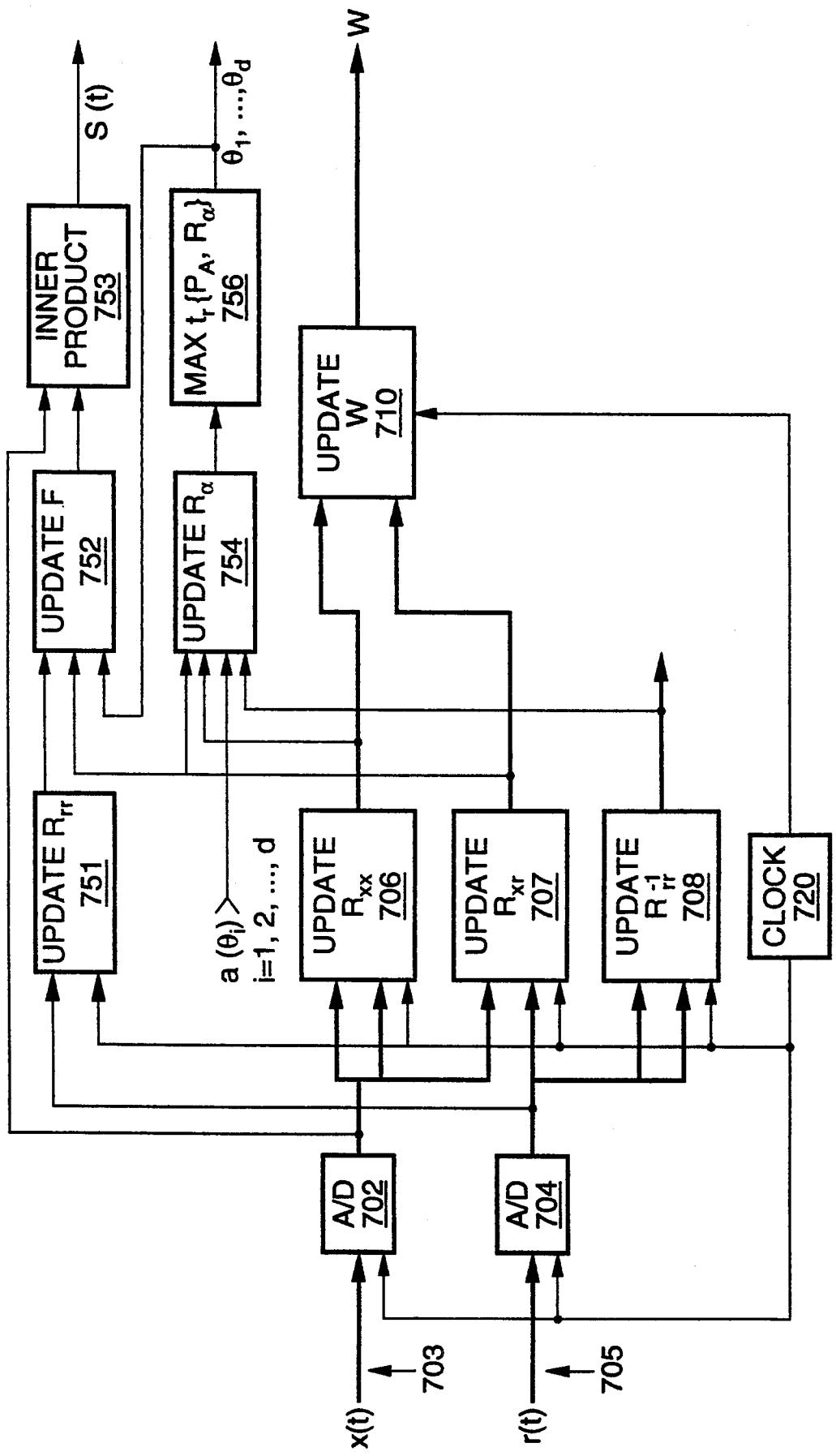
FIG. 7E is a block diagram of a cyclic least squares ("CLS") processor for direction of arrival ("DOA") estimation, according to the present invention.
Figure 7F:
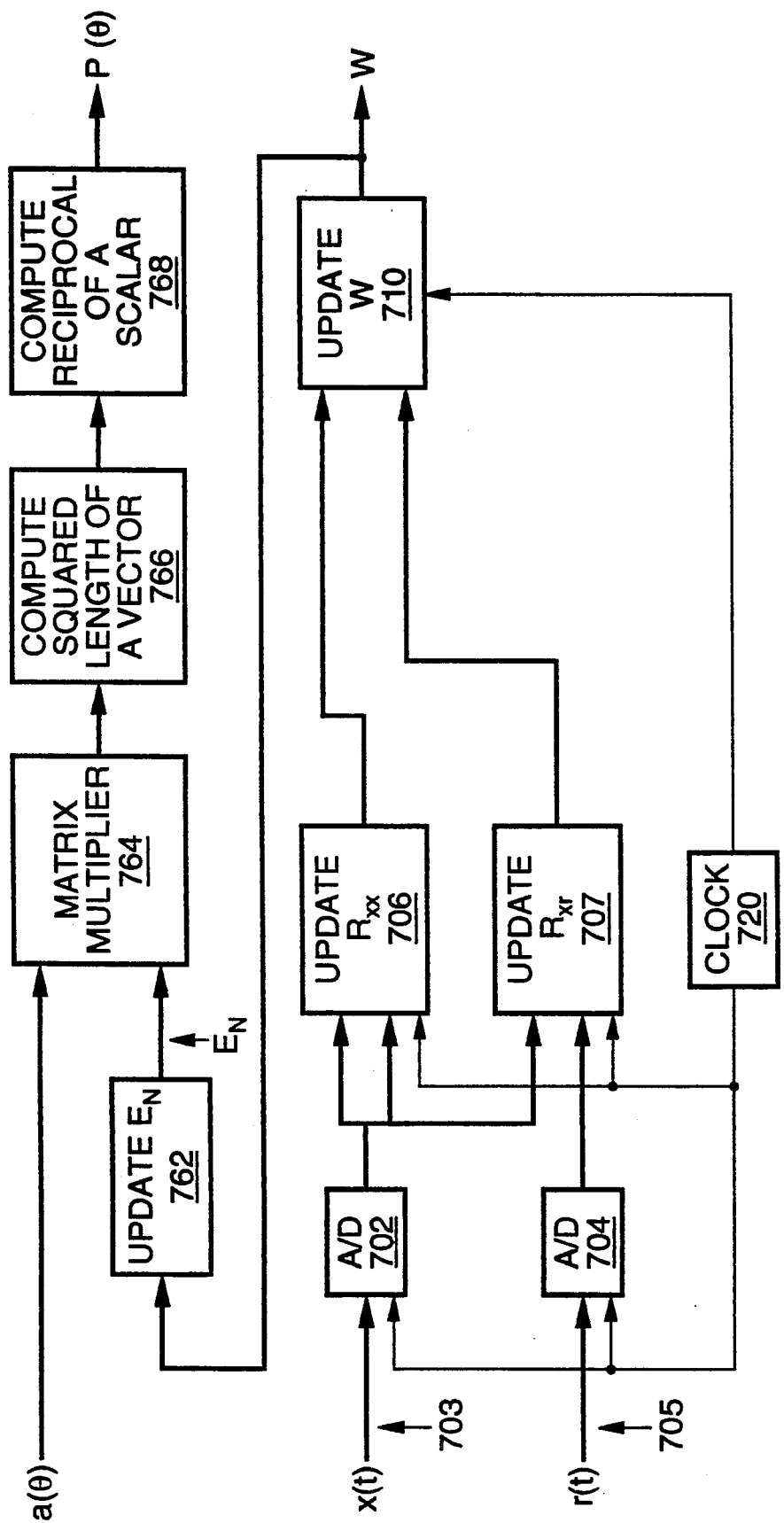
FIG. 7F is a block diagram of a phase-SCORE processor depicting function blocks for generating a measurement of orthogonality, according to the present invention.

FIG. 7F depicts a phase-SCORE processor for direction of arrival ("DOA") estimation, including a mechanism for generating a measure of orthogonality, according to the present invention. The structure shown in FIG. 7F is similar to the structure for the phase-SCORE processor shown in FIG. 7A, except that FIG. 7B includes additional function blocks 762, 764, 766 and 768. The function of these four additional blocks is to generate a measure of orthogonality. More specifically, function blocks 764, 766 and 768 are details of function block 714 in FIG. 7B.

A modified form of the phase-SCORE algorithm for DOA estimation uses both the solutions used above and the solutions used by the phase-SCORE signal extraction algorithm. The matrix $E_N$ is defined as above, and in addition a matrix $E_S$ is defined as containing the eigenvectors having non-negligible eigenvalues:

$$E_S = [w_1 w_2 \cdots w_d] \quad (26)$$

This signal subspace matrix is then used along with the null space matrix to form a different orthogonality measure $P_2(\theta)$, given by $$P_2(\theta) = \frac{||E_S^\dagger a(\theta)||^2}{||E_N^\dagger a(\theta)||^2} \quad (27)$$

This new measure $P_2(\theta)$ is then searched for peaks as before. The new measure $P_2(\theta)$ is referred to as the ARMA-like orthogonality measure due to its similarity with the power spectral density of an autoregressive-moving moving average (ARMA) scalar time series. In contrast, the measure $P_1(\theta)$ is similar to the power spectral density of an autoregressive scalar time series. The new orthogonality measure (27) has the advantage that it better suppresses strong interference.

The apparatus of the present invention for solving the eigenvalue Eq. (22) is identical to the apparatus used in the phase-SCORE signal extraction algorithm, except that eigenvectors corresponding to only the negligible eigenvalues are needed if the first measure $P_1(\theta)$ is used.

Just as cross-SCORE and phase-SCORE can be generalized by obtaining the reference signal vector r(t) as a filtered and frequency-shifted version of x(t) according to Eq. (18), so too can the phase-SCORE DOA estimation algorithm be generalized in an identical manner without affecting the mathematical form.

In summary, the method of the present invention referred to as the phase-SCORE DOA estimation algorithm is composed of the following steps:

1. Using an analog or digital measurement of the complex data x(t) from a set of sensor elements, compute the $R_{xx}$ matrix using Eq. (9). This can be accomplished by updating $R_{xx}$ after each new measurement of x(t).
2. Form r(t) from x(t) using Eq. (12) or (18), and compute $R_{xr}$ using Eq. (11).
3. Solve Eq. (22) for all eigenvectors if using $P_2(\theta)$ or for the eigenvectors of the negligible eigenvalues if using $P_1(\theta)$; then form both matrices $E_S$ and $E_N$, or form only $E_N$, respectively.
4. Search over all possible $\theta$ for the peaks in the function $P_1(\theta)$ in Eq. (25) or in the function $P_2(\theta)$ in Eq. (27); the resulting peak locations are the DOA estimates.

FIG. 7B depicts a phase-SCORE processor for direction of arrival ("DOA") estimation, including a mechanism for locating peaks, according to the present invention. The structure of this phase-SCORE processor for DOA estimation is similar to the structure of the phase-SCORE processor shown in FIG. 7A, except that FIG. 7B includes additional function blocks 712, 714 and 716. These additional function blocks perform a peak locating function.

FIG. 7C depicts a modified phase-SCORE processor for direction of arrival ("DOA") estimation, including a mechanism for locating peaks, according to the present invention. The structure for the modified phase-SCORE processor for DOA estimation is similar to the structure for the phase-SCORE processor for DOA estimation depicted in FIG. 7B, except that FIG. 7C includes an additional function block 738. Function blocks 732, 734, 736 and 738 perform a peak locating function.

The alternative algorithm, Cyclic MUSIC, is obtained by simply deleting the matrix $R_{xx}$ in Eqs. (22) and

(24) and eliminating step 1 in the four-step procedure, yielding the following three-step procedure:
1. Form r(t) from x(t) using Eqs. (12) or (18), and compute $R_{xr}$ using Eq. (11).
2. Solve the following equation for eigenvectors corresponding to the negligible eigenvalues, $$\lambda w = R_{xr} w, \qquad (28)$$

and form the matrix $E_N$ as in Eq. (23).

3. Search over all possible $\theta$ for the peaks in the function $P_1(\theta)$ in equation (25); the resulting peak locations are the DOA estimates.

FIG. 7D depicts a Cyclic MUSIC processor for direction of arrival ("DOA") estimation, including a mechanism for locating peaks, according to the present invention. The structure for the Cyclic MUSIC processor for DOA estimation is similar to the structure for the phase-SCORE processor for DOA estimation as shown in FIG. 7B, except that in FIG. 7D the output from block 706 ($R_{xx}$) is disconnected from block 710 (update w). Function blocks 742, 744 and 746 perform a peak locating function.

The phase-SCORE and Cyclic MUSIC direction estimation inventions use the fact that the null space of the matrix pair {$R_{xr}$, $R_{xx}$} or of the matrix $R_{xr}$, respectively, becomes orthogonal to the direction vector of each spectrally self-coherent signal after an infinite number of data samples has been collected. An alternative approach to exploiting the spectral self-coherence properties of the signals of interest is used in the Cyclic Least Squares (CLS) algorithm.

The CLS algorithm finds the direction vector estimates that are closest to the actual direction vectors of the spectrally self-coherent signals of interest, where closeness is measured as follows. Given a set of possible direction vector estimates, an estimate of the spectrally self-coherent components of the measured data that are impinging on the array from those directions is formed. The estimates, which are linear combinations of frequency-shifted (by $\alpha$) data, are subtracted from the measured data. The energy in the resultant residual is taken to be the squared distance between the direction vector estimates and the actual direction vectors. If the signal estimates are accurate, then the residual energy will be very small when evaluated using the correct direction vectors. Thus, searching for the set of direction vectors that minimizes this distance should yield accurate estimates of the actual direction vectors and, thus, of the actual directions of arrival of the spectrally self coherent signals.

Note that the phase-SCORE and Cyclic MUSIC algorithms can also be thought of as minimizing the distance between the estimated and actual direction vectors, but their respective distance measures are different from the one used in CLS.

Mathematically, the CLS algorithm can be expressed as $$\min_{\theta_1,\ldots,\theta_d, s(t)} < ||x(t) - [a(\theta_1) \ldots a(\theta_d)]s(t)||^2 > \qquad (29)$$

where d is the number (assumed to be known) of transmitted signals being received by the processor (unknown d is considered later) and where the estimate of the spectrally self-coherent signal vector is given by the $d \times 1$ vector $$\hat{s}(t) = Fr(t), \qquad (30)$$

where r(t) is the reference signal vector (12) obtained by frequency shifting the received data x(t). The final processor output signal y(t) is obtained by computing the vector product of Fx(t). Minimizing in Eq. (29) with respect to the d x M matrix F yields, $$F = (A^t A)^{-1} A R_{xr} R_{rr}^{-1}, \qquad (31)$$

which, when substituted back into Eq. (30), yields the CLS algorithm $$\max_{\theta_1,\ldots,\theta_d} tr\{P_A R_a\}, \qquad (32)$$

where tr{.} is the trace operator and where $R_a$ is given by $$R_a = R_{xr}^t R_{rr}^{-1} R_{xr}, \qquad (33)$$

the projection matrix for the space spanned by the direction vectors is given by $$P_A = A(A^t A)^{-1} A^t, \qquad (34)$$

a given set of DOA estimates, $A = [a(\theta_1) \ldots a(\theta_d)]$, where $a(\theta)$ is defined as in Eq. (25).

Once the estimates of the directions of arrival $\theta_1, \theta_2, \ldots, \theta_d$ have been found from Eq. (32), they can be substituted into Eq. (31) to perform signal extraction, which can be substituted into Eq. (30).

In the case where d is unknown, it can be estimated as follows. Assume $d=1$ and solve Eq. (32), obtaining the maximum value of $tr\{P_A R_a\}$ and referring to this value as CLS(1). Repeat this procedure for $d=2$, $d=3$, and so on, saving the maximum values CLS(2), CLS(3), and so on, until the condition $CLS(d) = CLS(d+1)$ is satisfied (either exactly or within some allowable error tolerance). This resulting value of d should then be taken to be the number of transmitted desired signals being received by the processor, and thus is the number of DOA estimates to find. Note that these DOA estimates are found automatically in the process of determining d (by virtue of having to solve Eq. (32)).

A slightly modified version of the above CLS algorithm, which requires slightly less computation, has been shown to provide accurate DOA estimates, but has not been shown to be the solution to an optimization problem. This modified version is simply the CLS algorithm with the matrix $R_a$ replaced by $R_{xr}$. This is the same modification that is made to obtain the phase-SCORE eigenequation from the cross-SCORE eigenequation.

Just as the other SCORE algorithms can be generalized by obtaining the reference signal vector r(t) as a filtered as well as frequency-shifted version of x(t), so too can the CLS algorithm be generalized in an identical manner without affecting the mathematical form.

In summary, the method of the present invention referred to as the Cyclic Least Squares algorithm is composed of the following steps:
1. Form r(t) from x(t) using Eq. (12) or (18), and compute $R_{rr}$ and $R_{xr}$ using Eqs. (10) and (11).

2. Form the matrix $R_\alpha$ using Eq. (33).
3. Perform a multidimensional search over $\theta_1, \ldots, \theta_d$ for the maximum of Eq. (32), recomputing the projection matrix $P_A$ using Eq. (34) as needed. The resulting $\theta_1, \ldots \theta_d$ are the DOA estimates.
4. If signal extraction is desired, use the DOA estimates from step 3 in (31), and then use (31) to form the signal estimates as in (30).

For the special case of setting the cycle frequency parameter $\alpha$ equal to zero, both CLS algorithms reduce to an existing algorithm in the literature known as Maximum Likelihood by Alternating Projections. The paper is titled, "Maximum Likelihood Localization of Multiple Sources by Alternating Projection," by I. Ziskind and M. Wax in *IEEE Transaction on Acoustics, Speech, and Signal Processing*, volume 36, number 10, October 1988, pp. 1553-1560.

FIG. 7E depicts a cyclic least squares ("CLS") processor for direction of arrival ("DOA") estimation, including a mechanism for locating peaks, according to the present invention. Function blocks 754 and 756 perform a peak locating function.

The same alternating projections technique used in that paper can be applied to the CLS algorithms to obtain computationally efficient implementations.

Extraction and Estimation of DOA for Wideband

The above embodiments address the problems of blind adaptive spatial filtering for signal extraction and signal-selective DOA estimation. However, those embodiments are discussed only in the context of narrowband signals. In the field of antenna array signal processing, a received signal is considered to be narrowband if its bandwidth is less than the reciprocal of the time required for the signal to propagate across the array. When this condition is violated, the array response vector is no longer constant across the received signal bandwidth, and thus the received signal model upon which the aforementioned algorithms are based becomes invalid. For example, signals having bandwidth equal to a significant fraction of their center frequency typically violate the narrowband assumption. Here these algorithms are extended to accommodate wideband signals.

Wideband Signal Extraction

The narrowband signal model can be represented as $$x(t) = \sum_{l=1}^{L} a(\theta_l) s_l(t) + i(t), \quad (35)$$

where $\theta_l$ is the DOA of the lth signal, and $s_l(t)$ and $i(t)$ are the interference and noise, is not valid for wideband signals because the array response vector $a(\theta_l)$ is no longer constant over the bandwidth of $s_l(t)$. A more appropriate model can be expressed as $$x(t) = \sum_{l=1}^{L} a(\theta_l, t) \otimes s_l(t) + i(t), \quad (36)$$

where $a(\theta,t)$ is the impulse responses of the array to a signal from direction $\theta$ and $\otimes$ denotes convolution. For signals that are Fourier-transformable, this model can be reexpressed as $$X(f) = \sum_{l=1}^{L} A(\theta_l, f) S_l(f) + I(f), \quad (37)$$

where f is the frequency variable and the upper case letters denote the Fourier transforms of their lower case counterparts.

Since the corresponding narrowband algorithms perform spatial filtering using a linear combiner, $$\hat{s}_1(t) = w^\dagger x(t), \quad (38)$$

but do not perform spectral filtering, then it is difficult for a weight vector w to reject wideband interference and thus extract the desired signal(s).

Three different methods for solving this problem are presented here. The first method is actually the application of the narrowband SCORE inventions to the wideband data without modification; useful signal extraction can still be achieved. The second method, Dual-Band SCORE, extracts the desired signal(s) from each narrow frequency band by exploiting the spectral coherence between the signal components in that band and in another band; these narrowband signals are then recombined to form an estimate of the wideband signal. The third method, Wideband SCORE, is a full extension of the SCORE technique to wideband signals that employs tapped delay lines on each sensor to perform joint spatial and spectral filtering.

A fourth method, Spatial ALC, that does not exploit spectral coherence and is not applicable to the aforementioned wideband received signal model is presented. However, if the received data satisfies the narrowband assumption yet the desired signals have substantially greater bandwidth than the interference, then this method can reject the interference and separate the signals of interest. The method uses the basic structure of the cross-SCORE processor with an adaptive line canceller in place of the frequency-shift device.

Application of SCORE to Wideband Signals

As mentioned in the above, spatial filtering alone is often insufficient to satisfactorily reject wideband interference. However, in the special case of narrowband interference, the cross-SCORE and phase-SCORE processors can reject the interference despite the wideband nature of the desired signal(s). That this behavior will indeed occur can be seen by considering the fact that each narrowband interfering signal does satisfy the narrowband assumption so its contribution to the received signal autocorrelation and cyclic autocorrelation matrices has rank equal to one. Thus, any weight vector that is nearly or completely orthogonal to the array response vectors of the interference attenuates it or rejects it completely. However, if the desired signal(s) are wideband, then each processor output will be a linear combination of distorted (due to the frequency dependence of the array response vector) versions of the desired signals. If more than one desired signal is present, then since no memoryless weight vector can reject a wideband signal, each processor output will contain all wideband signals of interest. Nonetheless, since the interference has been screened out, a postprocessor employing spectral filtering can equalize the distortion and separate the desired signal from each other if they are in disjoint spectral bands.

Dual-Band SCORE

Unlike the application of the narrowband SCORE algorithm to wideband signals, the method presented here, Dual-Band SCORE, explicitly recognizes the wideband nature of the received signals and is structured accordingly. In this method, the wideband data is decomposed into disjoint frequency bands having sufficiently small bandwidth such that the narrowband assumption is valid for each band. Each band can then be processed by one (or more, if more than one desired signal is present) weight vector to remove interference and separate the desired signals. The individual narrowband components of any given desired signal can then be recombined and equalized to yield a satisfactory estimate of the wideband desired signal. Thus this approach can be interpreted as frequency decomposition followed by narrowband spatial processing followed by frequency recomposition.

The weight vectors are chosen by the cross-SCORE or phase-SCORE algorithm, in which r(t) is obtained from a different band than that from which x(t) is obtained. That is, the two signals to be cross correlated for any particular band of interest are the received signal for the band of interest and the received signal for a different band separated from the band of interest by a cycle frequency $\alpha$. Because the desired signal components of these two bands are correlated and the interference components are not, only the desired signal components will remain in the cross correlation matrix after sufficient averaging time. Furthermore, since the narrowband assumption is satisfied, the cross-SCORE or phase-SCORE algorithms can reject the interference and separate the desired signals, provided the usual assumptions (discussed above) are satisfied. Although the reconstructed wideband estimate of a desired signal may be distorted, post-processing techniques such as modulus restoral or decision-direction may be used to correct this by finding the appropriate spectral equalization filter.

Specifically, consider the wideband signal x(t) being split into two frequency bands $x_1(t)$ and $x_2(t)$ where the center frequencies of the two bands are separated by a cycle frequency $\alpha$. Then a weight vector w(1) to be applied to $x_1(t)$ can be found by applying the cross-SCORE or phase-SCORE algorithm to $x_1(t)$ (instead of to x(t)) and replacing r(t) by $x_2(t)$ (instead of obtaining r(t) from $x_1(t)$). Similarly, a weight vector w(2) to be applied to $x_2(t)$ can be found by applying the cross-SCORE or phase-SCORE algorithm to $x_2(t)$ and replacing r(t) by $x_1(t)$. Finally, the extracted signals from the two bands are recombined to form the final estimate of the desired signal, $$y(t) = w^\dagger(1)x_1(t) + w^\dagger(2)x_2(t).$$

FIGS. 8A and 8B depict a dual-band SCORE processor for signal extraction, according to the present invention. Function blocks 802 and 844 decompose wideband signal x(t) into two frequency bands $x_1(t)$ and $x_2(t)$. Function blocks 806 generates scalar products w(1) and $x_1(t)$, and function block 808 generates scalar product of w(2) and $x_2(t)$. As described above, weight vectors w(1) and w(2) can be found using either the cross-SCORE or phase-SCORE algorithm. Consequently, weight vectors w(1) and w(2) can be obtained by using either the cross-SCORE processor shown in FIG. 5, or the phase-SCORE processor shown in FIG. 7A.

Wideband SCORE

Another method that explicitly recognizes the wideband nature of the desired signals is the Wideband SCORE algorithm. Unlike the Dual-Band SCORE which explicitly decomposes the wideband data into narrow bands that can be individually spatially filtered and then recombined, the Wideband SCORE algorithm (effectively) finds the spatial and spectral filters that jointly restore the spectral coherence of the processor output signal. This is accomplished by adding a tapped delay line of length K and tap spacing to each antenna sensor. A composite received signal vector $\bar{x}(t)$ can then be defined as the stack of the delay line outputs for the sensors, $$\bar{x}(t) = [x(t), x(t-\tau_o), \ldots x(t-(K-1))]^T, \quad (39)$$

where $[.]^T$ denotes transpose.

This extended vector is then processed by cross-SCORE or phase-SCORE in the usual way, effectively performing joint spatial and temporal processing to restore spectral coherence. In so doing, it can apply spectral and/or spatial filtering to reject narrowband and wideband interference and separate desired signal components. However, the distortion introduced by the spectral filtering would need to be equalized as discussed in regard to Dual-Band SCORE.

Figure 9:
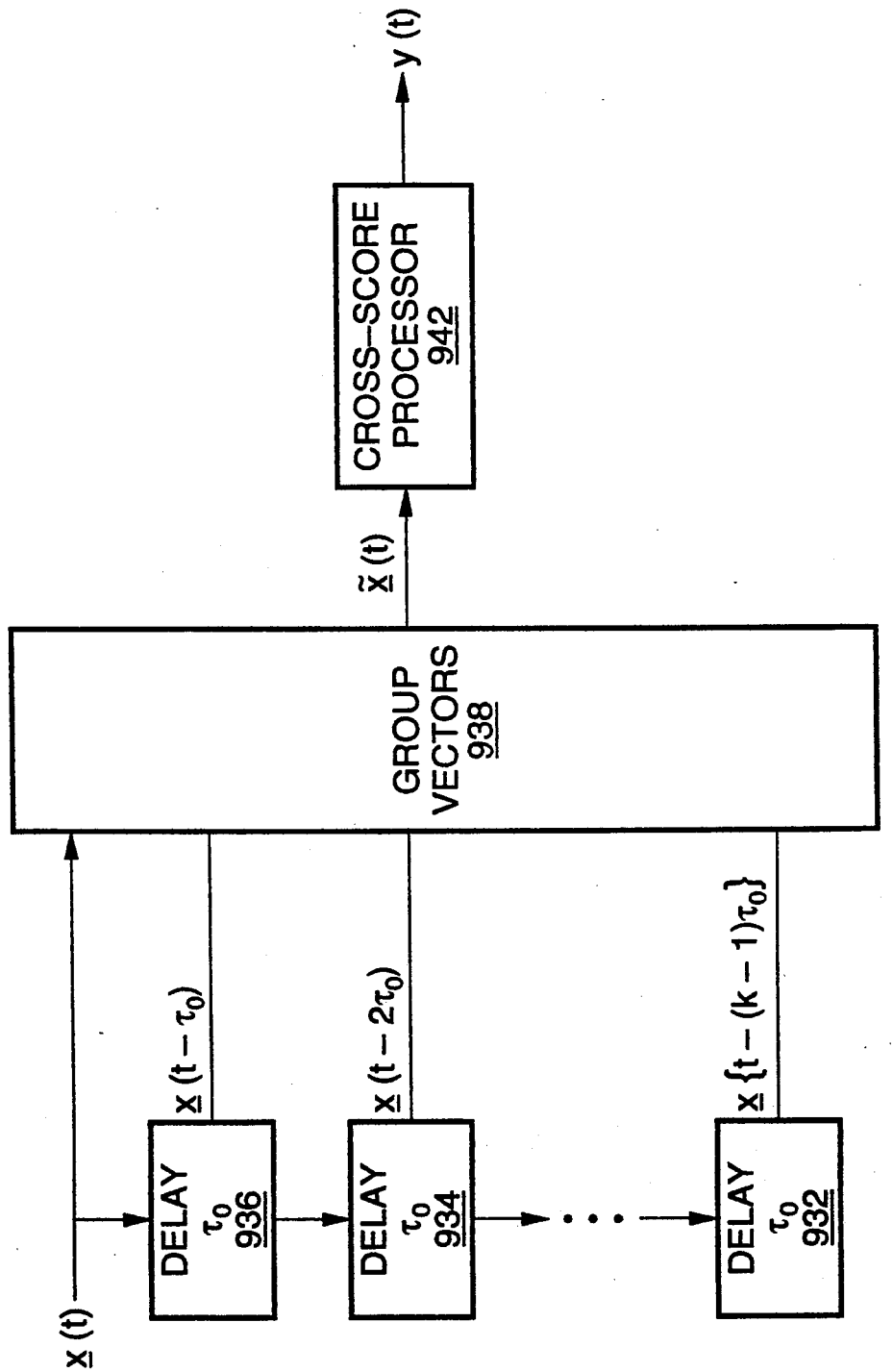
FIG. 9 is a block diagram of a wideband SCORE processor for signal extraction, according to the present invention.

FIG. 9 depicts a block diagram of a wideband SCORE processor for signal extraction, according to the present invention. Function blocks 936, 934 and 932 delay received signal x(t) and generate (k−1) delayed signals. Function block 938 generates composite received signal vector based on the received signal and (k−1) delayed signals. Function block 942 is a cross-SCORE processor that extracts a desired signal, e.g. the processor shown in FIG. 6.

Spatial ALC

Unlike the other algorithms considered above, the one discussed here does not exploit spectral coherence nor is it considered for the case of wideband signals. However, it does exploit the novel structure of the cross-SCORE processor by replacing the frequency-shift operation in the reference path with an adaptive line canceller (ALC). Thus, oscillators 214, 314 and 414 and multipliers 211, 311 and 411 of FIGS. 2, 4 and 6 may be replaced with respective ALCs. Furthermore, in FIGS. 4 and 6, only one element of the output vector of the optional complex conjugations 310 and 410, respectively, is processed by the ALC. The spectral filter found by the ALC is then applied individually and separately to the remaining elements of the output vector of blocks 310 and 410. The resulting vector composed of the ALC output and the filtered versions of the remaining elements is the reference signal vector r(t).

The ALC is a familiar algorithm to practitioners skilled in the art of signal processing. See, e.g., *Adaptive Signal Processing* by Widrow and Stearns, Prentice-Hall, Englewood Cliffs, N.J. 1985. The ALC operates on the data vector x(t). The ALC uses a spectral filter to reject interference having bandwidth substantially less than the bandwidth of the desired signal(s). Thus, the output of the ALC followed by the linear combiner with weight vector c is a distorted version of the received data less the narrowband interference. If all interferers present are sufficiently narrowband that they are cancelled by the ALC, then the ALC output will consist of only residual noise and components that are correlated with the desired relatively wideband signals. Thus, the output of the ALC and linear combiner serves the same purpose as the cross-SCORE reference path derived from frequency-shifted and beamformed data. That is, the cross-SCORE processor with the frequency-shift device following the linear combiner replaced by an ALC preceding the linear combiner will adapt the weight vector w so as to reject the narrowband interference by spatial filtering and pass the desired signals (which are not distorted by spectral filtering).

One example in which this method would be applicable is described here. In the 100-1000 MHz band, desired signals having bandwidths less than 10% of their respective center frequencies (e.g., 10-100 MHz) approximately satisfy the narrowband assumption. Also present in that band are many commercial television signals which contain relatively powerful spectral lines (due to the horizontal synchronization component of the signal). The Spatial ALC can reject the TV interference and separate the desired signals.

Wideband Direction Estimation

As mentioned in the above, the narrowband signal model does not hold when wideband signals are received. In particular, the cyclic autocorrelation matrix can have rank greater than the number of signals exhibiting spectral coherence at the cycle frequency of interest. For example, in the Cyclic MUSIC algorithms, the corresponding reduction in the dimension of the null space of that matrix or elimination of the null space can prevent the algorithms from operating properly.

Figure 10:
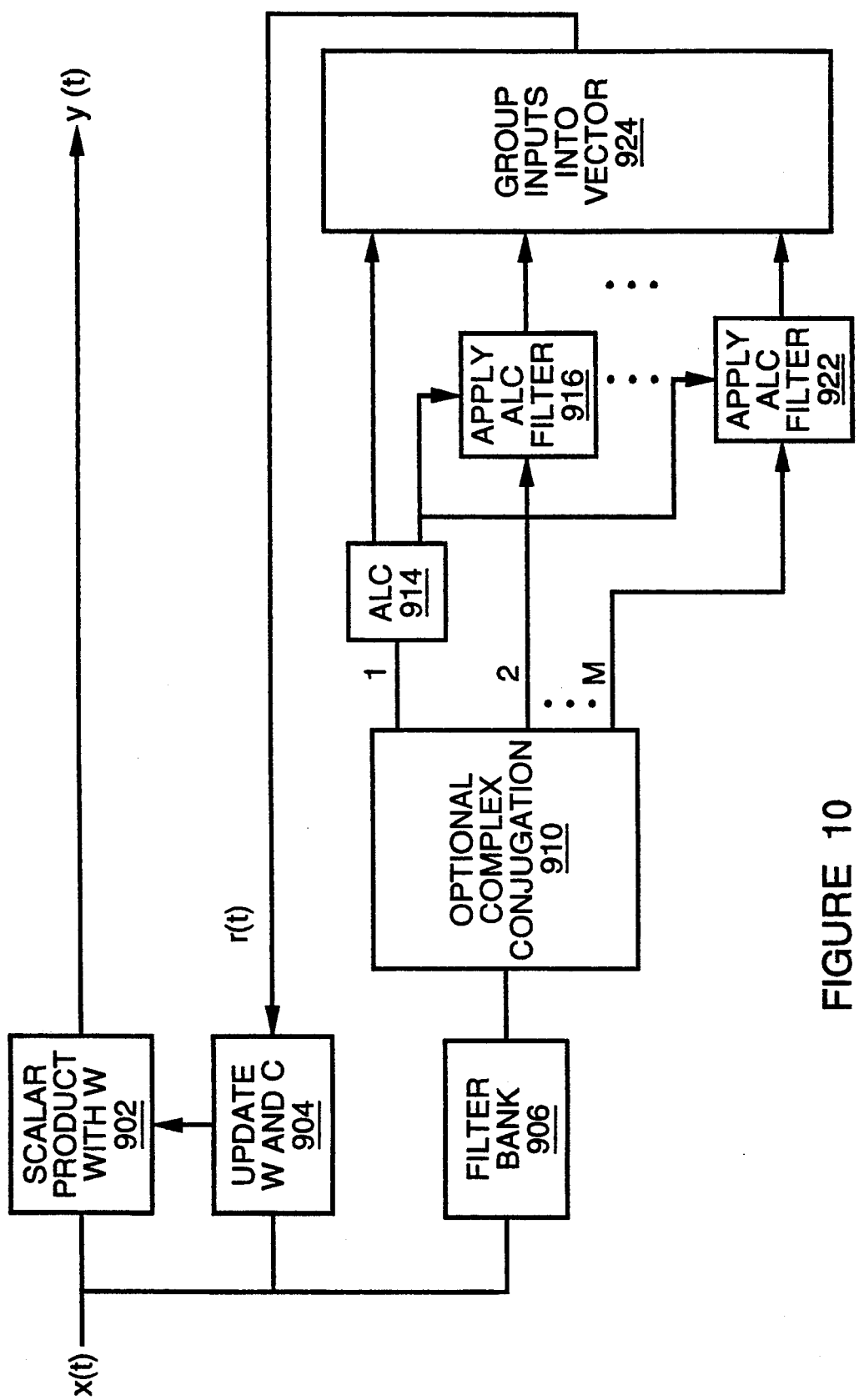
FIG. 10 is a block diagram of a spatial adaptive line canceler ("ALC") processor for signal extraction, according to the present invention.

FIG. 10 depicts a block diagram of a spatial adaptive line canceler ("ALC") processor for signal extraction, according to the present invention.

The structure of FIG. 10 is similar to that of FIG. 6. Specifically, function blocks 902, 904, 906 and 910 in FIG. 10 correspond respectively to function blocks 402, 404, 406 and 410 in FIG. 6. Function blocks 914, 916, 922 and 924 generate the reference vector r(t) for the cross-SCORE processor.

Two methods for accommodating wideband signals are considered here. The first method, Dual-Band Cyclic MUSIC, finds the null space of a cross correlation matrix in which the two signals being correlated come from two disjoint frequency bands separated by the desired cycle frequency and having bandwidth sufficiently small that the narrowband signal model applies. The usual spatial spectrum .g., from Cyclic MUSIC) is then searched for peaks that correspond to the desired DOAs. The second method, Wideband Cyclic MUSIC, is a cyclic version of the conventional wideband MUSIC algorithm (see. M. Wax, et. al., "Spatio-Temporal Spectral Analysis by Eigenstructure Methods," *IEEE Trans. on Acoustics, Speech, and Signal Processing*, vol. ASSP-32, no. 4, August 1984, pp. 817-827. Using correlation matrices for multiple pairs of bands, Wideband Cyclic MUSIC simultaneously searches both in the DOA domain and in the frequency domain for the desired signal(s).

Dual-Band Cyclic MUSIC

Dual-Band Cyclic MUSIC simply cross correlates the signals from two narrow bands separated by the desired cycle frequency. The two bands must be sufficiently narrow that the narrowband assumption is valid. For example, the complex envelopes of the received data $x(t)=x_1(t-\tau)$ and $r(t)=x_2(t-\tau)$ from two bands separated by the desired cycle frequency $\alpha$ consists of desired signal components that are correlated and undesired interference and noise that are not:

$$x_1(t) = \sum_{l=1}^{L} a(f_1,\theta_l)s_l(f_1,t) + i_1(t) \qquad (40)$$
$$= A(f_1,\Theta)s(f_1,t) + i_1(t)$$

$$x_2(t) = \sum_{l=1}^{L} a(f_2,\theta_l)s_l(f_2,t) + i_2(t) \qquad (41)$$
$$= A(f_2,\Theta)s(f_2,t) + i_2(t),$$

where $f_i$ is the center frequency of the ith frequency band, $s_l(f_i,t)$ is the lth desired signal component from that band, $s_1(f_1,t)$ and $s_1(f_2,t)$ are correlated, $A(f_i,\Theta)$ is a matrix having $a(f_i,\theta_l)$, $l=1,\ldots,L$ as its columns, and $i_1(t)$ and $i_2(t)$ are uncorrelated. Thus, the cross correlation matrix with lag $\tau$ $R_{x_1x_2}(\tau)=R_{xr}$ is given by (in the limit as the averaging time goes to infinity), $$R_{xr}=R_{x_1x_2}(\tau)=A(f_1,\Theta)R_{s_1s_2}(\tau)A^\dagger(f_2,\Theta). \qquad (42)$$

The right null space of this matrix is orthogonal to the array response vectors corresponding to the second of the two narrow bands. That is, the right null space of $R_{xr}$ is orthogonal to the columns of $A(f_2,\Theta)$. After computing the right null space using Eq. (28) and forming the spatial spectrum using $A(f_2,\theta)$, the usual search for peaks in the spatial spectrum is performed. That is, for Dual Band Cyclic MUSIC $R_{x_1x_2}$ in Eq. (42) replaces $R_{xr}$ in Eq. (28) for Cyclic MUSIC.

In addition to the advantages due to signal selectivity shared by the narrowband versions of Cyclic MUSIC, this algorithm exploits the spectral coherence of the desired signals in a wideband received-signal environment but requires calibration data for only one narrow frequency band.

FIG. 11 is a block diagram of a Dual-Band Cyclic MUSIC processor for direction of arrival ("DOA") estimation, according to the present invention. In fact, the structure of function blocks is similar to that in FIG. 8A. Function blocks 952 and 954 decompose wideband signal x(t) into two frequency bands $x_1(t)$ and $x_2(t)$. Block 956 performs the function of estimating direction of arrival. Function block 956 (the Cyclic MUSIC processor) is shown in detail in FIG. 7D, except that $x_1(t)$ of FIG. 11 replaces x(t) in FIG. 7D, and $x_2(t)$ of FIG. 11 replaces r(t) in FIG. 7D.

Wideband Cyclic MUSIC

Wideband Cyclic MUSIC is essentially a cyclic version of the conventional Wideband MUSIC algorithm. However, the two algorithms differ significantly in their performance and applicability. Whereas the conventional Wideband MUSIC algorithm processes each frequency band independently of every other band, the Wideband Cyclic MUSIC algorithm exploits the correlation between the desired signal components in different bands. Furthermore, conventional Wideband MUSIC suffers from the constraint that the number of signals and interferers present in any frequency band must be less than the number of sensors, whereas Wideband Cyclic MUSIC requires only that the number of desired signals in any band be less than the number of sensors. All other advantages of Cyclic MUSIC algorithms over conventional algorithms also apply.

Decompose the wideband received data into K+k narrow bands, where $x_i(t)$ is the received data in band i, i=1, ..., K+k, and where the band centers $f_i$ and $f_{i+k}$ are separated by the desired cycle frequency α, for i=1, ...,K. Compute K cross-correlation matrices $R_{x_{i+k}x_i}$ for i=1, ..., K where $$R_{x_{i+k}x_i} = <x_{i+k}(t)x^\dagger_i(t)>. \tag{43}$$

The right null space $E_N(i)$ of the ith cross-correlation matrix (in the limit as averaging time goes to infinity) is orthogonal to the array response vectors $a(f_i,\theta)$ for the desired signals in the ith band, where $$E_N(i), = [w_{d+1}(i) \ldots w_m(i)] \tag{44}$$

and $w_m(i)$, m=d+1, ..., M are the eigenvectors of $R_{x_{i+k}x_i}$ corresponding to negligible eigenvalues $\lambda_m(i)$, m=d+1, ..., M, where the eigenvectors and eigenvalues are obtained by solving $$\lambda_m(i)w_m(i) = R_{x_{i+k}x_i}w_m(i) \tag{45}$$

for i=1, ..., K and m=1, ..., M, and d is determined by the partitioning of the eigenvalues. Thus, the spatial spectra as a function of the angle θ and the frequency band i having center frequency $f_i$ is given by $$P(\theta,i) = ||[E_N(i)]^\dagger a(f_i,\theta)||^{-2}. \tag{46}$$

The locations along the G-axis of the peaks in $P(\theta,i)$ are the desired DOA estimates.

Notice that Eqs. (40) and (41) in Dual-Band Cyclic MUSIC generalize easily to describe $x_i(t)$ for i=1, ... ,K+k and that Eq. (42) generalizes easily to the case of $R_{x_{i+k}x_i}$.

Figure 12:
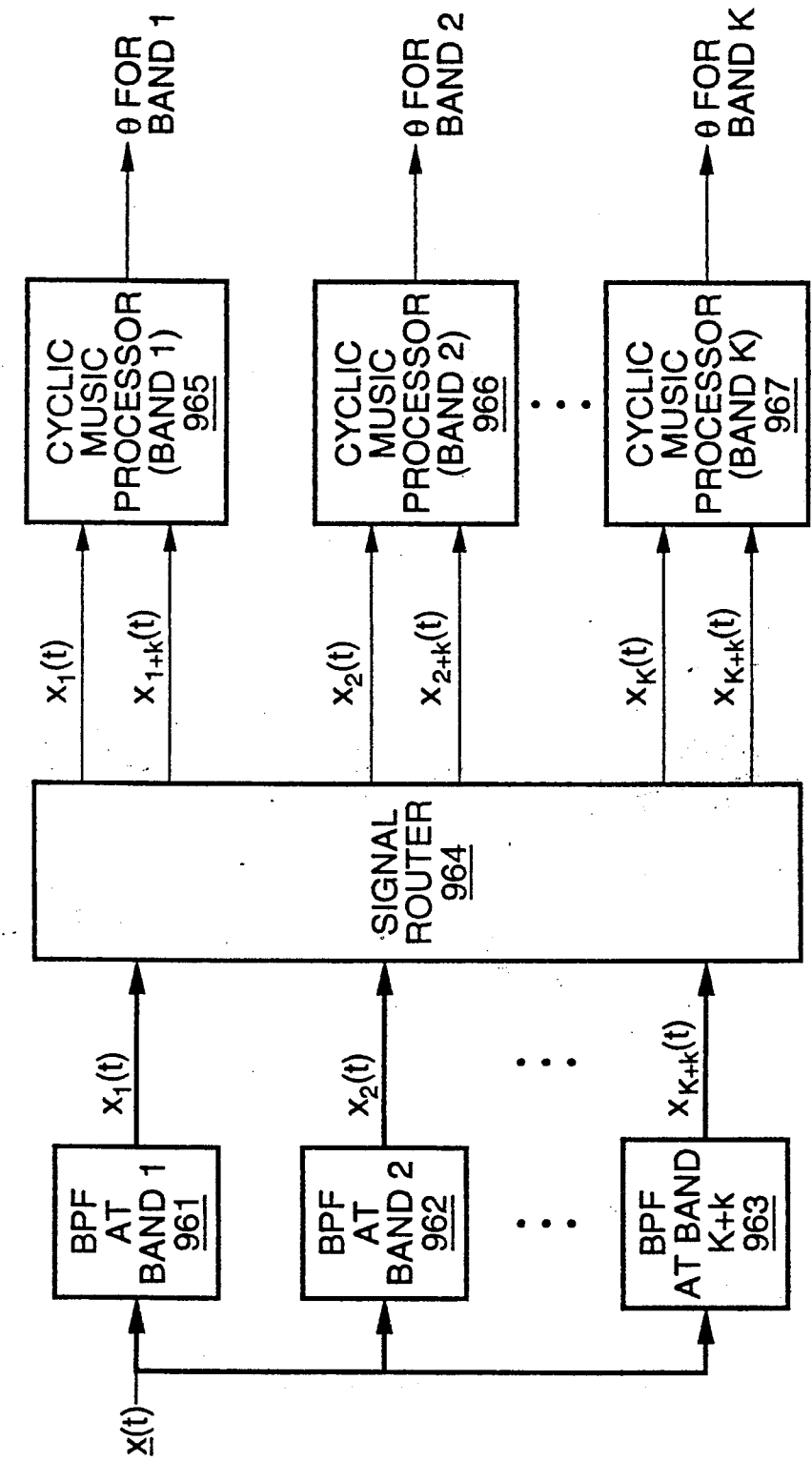
FIG. 12 is a block diagram of a wideband Cyclic MUSIC processor for direction of arrival ("DOA") estimation, according to the present invention.

FIG. 12 depicts a block diagram of a wideband Cyclic MUSIC processor for direction of arrival ("DOA") estimation, according to the present invention. Function blocks 961-963 decompose the wideband received data into K+k narrow bands. Function block 964 generates K pairs of signals, as indicated by equation (43). Function blocks 965-967 are Cyclic MUSIC processors. Function blocks 965-967 are shown in detail in FIG. 7D. As shown by FIG. 12, there are i cyclic MUSIC processors, where 1≤i≤K. The processor for band i obtains $E_N(i)$ by solving equation (45) as set forth in the Specification at page 57, where $E_N(i) = [W_{d+1}(i) \ldots W_m(i)]$ as stated by equation (44). This value of $E_N(i)$ is then used in equation (46) to locate peaks representing desired DOA estimates (see Specification, page 58, lines 1-3). Note that each cyclic MUSIC processor in FIG. 12 is identically represented by FIG. 7D, if the x(t) and r(t) inputs in FIG. 7D are replaced by $x_{i+k}(t)$ and by $x_i(t)$ respectively.

Accordingly, there has been described herein novel signal processing systems. Various modifications to the present invention will become apparent to those skilled in the art from the foregoing description and accompanying drawings. Accordingly, the present invention is to be limited solely by the scope of the following claims.

What is claimed is:

1. A processor adapting an array of antennas upon which one or more signals impinges and extracting a signal of interest s(t) therefrom, comprising:
   (a) means for receiving on an array of antennas upon which one or more signals impinges, a plurality of input signals represented by a signal input vector x(t) having M components in which each component comprises an electrical signal representing a complex measurement of a self-coherent signal of interest s(t) contained in said input signals together with interference from noise and/or other signals, said signal of interest s(t) having a measure of complex-valued self-coherence;
   (b) reference signal means, coupled to an output of said means for receiving, for generating a reference signal vector r(t) from said signal input vector x(t);
   (c) weight means for providing and updating a weight vector w having M components from said signal input vector x(t), said weight means having a first input coupled to an output of said means for receiving and a second input coupled to an output of said reference signal means, said weight means including means for preserving phase information of the complex-valued self-coherence of the signal of interest s(t) when generating an output signal y(t), said means for preserving phase information having a first input coupled to an output of said reference signal means and a second input coupled to an output of said weight means; and
   (d) summing means for generating an output signal y(t) having a measure of self-coherence, said summing means having a first input coupled to an output of said means for receiving and a second input coupled to an output of said weight means;
   (e) wherein said weight means provides and updates said weight vector w to maximize self-coherence in said output signal y(t).

2. The processor of claim 1, wherein said reference signal means includes:
   filtering means for filtering each component of said x(t) through a predetermined filter, and shifting means for frequency shifting each component of x(t) by a frequency α; and
   wherein said weight means includes:
   first correlator means for generating and updating an autocorrelation matrix of x(t), denoted $R_{xx}$;
   second correlator means for generating and updating a correlation matrix of x(t) and r(t), denoted $R_{xr}$; and
   generalized eigenvector means for generating and updating said weight vector w according to the equation $$\lambda R_{xx}w = R_{xr}w$$

wherein λ is non-negligible.

3. The processor of claim 2, wherein each component of x(t) has an associated phase such that a set of said M phases jointly contains direction of arrival information for all signals presented to the processor, and further including:
   at least one sensor coupled to an input of said means for receiving;
   means for generating a matrix $E_N$ including eigenvectors having eigenvalues, where $$E_N = [w_{d+1} \; w_{d+2} \ldots w_M],$$

and the following equation holds $$\lambda_i R_{xx}w_i = R_{xr}w_i,$$

where M is the number of sensors i=1, ..., M and $w_i$ is the ith eigenvector, and eigenvalues $\lambda_{d+1}, \ldots, \lambda_M$ are negligibly small compared with $\lambda_1, \ldots, \lambda_d$, d being determined from such partitioning of the eigenvalues;

means for generating a measure of orthogonality $P_1(\Theta)$ containing at least one peak, where $$P_1(\Theta) = ||(E_N)a(\Theta)||^{-2}$$

and where ( ) denotes a Hermitian or conjugate transpose operation, $\Theta$ is a direction of arrival estimation parameter, and $a(\Theta)$ is a corresponding direction vector; and means for locating peaks in said measure of orthogonality, said peaks corresponding to estimated directions of arrival for s(t).

4. A processor for extracting a signal of interest s(t) from a plurality of signals impinging upon an array of antennas, comprising:
  (a) means for receiving on an array of antennas upon which one or more signals impinges, a plurality of input signals represented by a signal input vector x(t) having M components in which each component comprises an electrical signal representing a complex measurement of a conjugate self-coherent signal of interest s(t) contained in said input signals together with interference from noise and/or other signals, said signal of interest s(t) having a measure of complex-valued conjugate self-coherence;
  (b) reference signal means, coupled to an output of said means for receiving, for generating a reference signal vector r(t) from said signal input vector x(t);
  (c) weight means for providing and updating a weight vector w having M components from said signal input vector x(t), said weight means having a first input coupled to an output of said means for receiving and a second input coupled to an output of said reference signal means, said weight means including means for preserving phase information of the complex-valued conjugate self-coherence of the signal of interest s(t) when generating an output signal y(t), said means for preserving phase information having a first input coupled to an output of said reference signal means and a second input coupled to an output of said weight means; and
  (d) summing means for generating an output signal y(t) having a measure of conjugate self-coherence, said summing means having a first input coupled to an output of said means for receiving and a second input coupled to an output of said weight means;
  (e) wherein said weight means provides and updates said weight vector w to maximize conjugate self-coherence in said output signal y(t).

5. The processor of claim 4, wherein:
said reference signal means includes:
filtering means for filtering each component of said x(t) through a predetermined filter; means for replacing each filtered component by the complex conjugate thereof; and means for frequency shifting each component of x(t) by a frequency $\alpha$; and
wherein said weight means includes:
first correlator means for generating and updating an autocorrelation matrix of x(t), denoted $R_{xx}$;
second correlator means for generating and updating a correlation matrix of x(t) and r(t), denoted $R_{xr}$; and
generalized eigenvector means for generating and updating said weight vector w according to the equation $$\lambda R_{xx}w = R_{xr}w$$

wherein $\lambda$ is non-negligible.

6. The processor of claim 5, wherein each component of x(t) has an associated phase such that a set of said M phases jointly contains direction of arrival information for all signals presented to the processor, and further including:

means for generating a matrix $E_N$ including eigenvectors having eigenvalues, where $$E_N[w_{d+1} \, w_{d+2} \cdots w_M],$$

and the following equation holds $$\lambda_i R_{xx} w_i = R_{xr} w_i,$$

where M is the number of antennas $i = 1, \ldots, M$ and $w_i$ is the ith eigenvector, and eigenvalues $\lambda_{d+1}, \ldots, \lambda_M$ are negligibly small compared with $\lambda_1, \ldots, \lambda_d$, d being determined from such partitioning of the eigenvalues;

means for generating a measure of orthogonality $P_1(\Theta)$ containing at least one peak, where $$P_1(\Theta) = ||(E_N)^T a(\Theta)||^{-2}$$

and where $(\ )^T$ denotes a transpose operation, $\Theta$ is a direction of arrival estimation parameter, and $a(\Theta)$ is a corresponding direction vector; and means for locating peaks in said measure of orthogonality, said peaks corresponding to estimated directions of arrival for s(t).

7. The processor of claims 2 or 5 wherein said processor extracts s(t) from a wideband signal input vector x(t) having a narrow band interference.

8. The processor of claims 2 or 5, wherein x(t) is a wideband signal, and further comprising:
means for decomposing the signal x(t) into two disjoint frequency bands $x_1(t)$ and $x_2(t)$ having center frequencies separated by a cycle frequency $\alpha$, where each of $x_1(t)$ and $x_2(t)$ satisfies a narrowband condition;
means for generating a reference vector $r_1(t)$ equal to $x_2(t)$ and for generating a reference vector $r_2(t)$ equal to $x_1(t)$;
means for obtaining w(1) from $x_1(t)$ and $r_1(t)$ and for obtaining w(2) from $x_2(t)$ and $r_2(t)$; and
means for reconstructing the wideband desired signal by adding the scalar products $$y(t) = w(1)x_1(t) + w(2)x_2(t).$$

9. The processor of claims 2 or 5 wherein x(t) is a wideband signal input vector, further comprising filter means for jointly restoring spectral coherence of the processor output signal.

10. The processor of claim 9 wherein said filter means is a tapped delay line of length K and tap spacing $\tau_o$ added to each said antenna for receiving said x(t) according to the equation $$x(t) = [x(t), x(t - \tau_o), \ldots x(t - (k-1)\tau_o)]^T$$

where $[\ ]^T$ denotes a transpose.

11. A processor for extracting a signal of interest s(t) from a signal input vector x(t) having M components in which each component comprises a complex measurement of s(t) together with interference from noise and/or other signals, comprising:
- (a) receiving means for receiving on an array of antennas upon which one or more signals impinges, a plurality of input signals represented by a signal input vector x(t) having M components in which each component comprises an electrical signal representing a complex measurement of a self-coherent signal of interest s(t) together with interference from noise and/or other signals;
- (b) reference signal means, coupled to said receiving means, for generating a reference signal vector r(t) from said signal input vector x(t), said reference signal means including an adaptive line canceler means for filtering;
- (c) means for computing the inverse of an autocorrelation matrix of said signal input vector x(t), denoted $R^{-1}_{xx}$;
- (d) means for computing a correlation matrix of said signal input vector x(t) and said reference signal vector r(t), denoted $R_{xr}$;
- (e) weight means for providing and updating a weight vector w having an equal number of components as said signal input vector x(t) by forming the product $R^{-1}_{xx}R_{xr}c$, where c is a vector having an equal number of components as said signal input vector x(t); and
- (f) summing means for generating an output signal y(t) having a measure of self-coherence, wherein said summing means has a first input coupled to said receiving means and a second input coupled to an output of said weight means;
- (g) wherein said weight means provides and updates said weight vector w to substantially maximize self-coherence in said output signal y(t) at frequency α and delay τ for predetermined values of α and τ.

12. The processor of claim 11, wherein said means for filtering comprises means for delaying each component of x(t) by a time equal to τ.

13. The processor of claim 11 wherein said means for generating y(t) further comprises:
- means for computing the correlation matrix of r(t) and x(t), $R_{rx}$;
- means for computing the autocorrelation matrices $R_{rr}$ and $R_{xx}$;
- means for computing the inverse of the autocorrelation matrix of r(t), $R_{rr}$; and
- means for finding the values of λ, w and c that solve the system of equations $$\lambda R_{xx}w = R_{xr}R^{-1}_{rr}R_{rx}w$$

14. The processor of claim 13 wherein said filtering means comprises means for delaying each component of x(t) by a time equal to τ.

15. The processor of claim 13 wherein said means for generating y(t) further comprises:
- means for computing the correlation matrix of r(t) and x(t), $R_{rx}$;
- means for computing the autocorrelation matrices $R_{rr}$ and $R_{xx}$;
- means for computing the inverse of the autocorrelation matrix of r(t), $R^{-1}_{rr}$; and
- means for finding the values of λ, w and c that solve the system of equations $$\lambda R_{xx}w = R_{xr}R^{-1}_{rr}R_{rx}w$$

$$\lambda R_{rr}c^8 = R_{rx}R^{-1}_{xx}R_{xr}c^*$$

16. An apparatus for extracting a signal of interest s(t) from a signal input vector x(t) having components in which each component comprises a complex measurement of s(t) together with interference from noise and/or other signals, comprising:
- (a) receiving means for receiving on an array of antennas upon which one or more signals impinges, a plurality of input signals represented by a signal input vector x(t) having M components in which each component comprises an electrical signal representing a complex measurement of a conjugate self-coherent signal of interest s(t) together with interference from noise and/or other signals;
- (b) means for generating a reference signal vector r(t) from said signal input vector x(t) by using an adaptive line canceler; means for replacing each component in said reference signal vector r(t) by the complex conjugate thereof; and means for frequency shifting each component of said signal input vector x(t) by frequency α;
- (c) means for computing an inverse of the autocorrelation matrix of said signal input vector x(t), denoted $R^{-1}_{xx}$;
- (d) means for computing a correlation matrix of said signal input vector x(t) and said reference signal vector r(t), denoted $R_{xr}$;
- (e) weight means for providing and updating a weight vector w having an equal number of components as said signal input vector x(t) by forming the product $R^{-1}_{xx}R_{xr}c^*$, where c is a vector having an equal number of components as said signal input vector x(t); and
- (f) summing means for generating an output signal y(t) having a measure of conjugate self-coherence, said summing means having a first input coupled to said receiving means and a second input coupled to an output of said weight means;
- (g) wherein said weight means provides and updates said weight vector w to substantially maximize conjugate self-coherence in said output signal y(t) at frequency α and delay τ for predetermined values of α and τ.

17. A processor for extracting a signal of interest s(t) from a signal input vector x(t) having M components in which each component comprises a complex measurement of s(t) together with interference from noise and/or other signals, comprising:
- (a) means for receiving on an array of antennas upon which one or more signals impinges, a plurality of input signals represented by a signal input vector x(t) having M components in which each component comprises an electrical signal representing a complex measurement of a self-coherent signal of interest s(t) together with interference from noise and/or other signals;
- (b) weight means for obtaining and updating a weight vector w having M components from said signal input vector x(t), said weight means having an input coupled to an output of said means for receiving;
- (c) summing means for generating and updating an output signal y(t) having a measure of self-coherence, wherein said summing means has a first input coupled to an output of said means for receiving and a second input coupled to an output of said weight means;

(d) wherein said weight means obtains and updates said weight vector w to maximize self-coherence in said output signal y(t); and (e) wherein said processor extracts a signal of interest s(t) from a wideband signal input vector x(t) having a narrow band interference.

18. The processor of claim 17, further including:

reference signal means for generating a reference vector r(t) from said x(t), coupled to an output of said means for receiving, including means for filtering each component of said x(t) through a predetermined filter, and means for frequency shifting each component of said x(t) by a frequency $\alpha$;

first correlator means for generating an inverse of an autocorrelation matrix of said x(t), denoted $R^{-1}_{xx}$;

second correlator means for generating a correlation matrix of said x(t) and said reference vector r(t), denoted $R_{xr}$;

means for obtaining and updating a vector c having M components; and means for generating a product of $gR_{xx}^{-1}R_{xr}c$ to provide said weight vector w, where g is an arbitrary scaler gain variable.

19. A processor for extracting a signal of interest s(t) from a signal input vector x(t) having M components in which each component comprises a complex measurement of s(t) together with interference from noise and/or other signals, comprising:

(a) means for receiving on an array of antennas upon which one or more signals impinges, a plurality of input signals represented by a signal input vector x(t) haivng M components in which each component comprises an electrical signal representing a complex measurement of a conjugate self-coherent signal of interest s(t) together with interference from noise and/or other signals;

(b) weight means for obtaining and updating a weight vector w having M components from said signal input vector x(t), said weight means having an input coupled to an output of said means for receiving;

(c) summing means for generating an output signal y(t) having a measure of conjugate self-coherence, wherein said summing means has a first input coupled to an output of said means for receiving and a second input coupled to an output of said weight means;

(d) wherein said weight means obtains and updates said weight vector w to maximize conjugate self-coherence in said output signal y(t); and (e) wherein said processor extracts a signal of interest s(t) from a wideband signal input vector x(t) having a narrow band interference.

20. The processor of claim 19, further including:

reference signal means, coupled to an output of said receiving means for generating a reference vector r(t) from said x(t), said reference signal means including means for filtering each component of said x(t) through a predetermined filter, means for replacing each said filtered each component by the complex conjugate thereof, and further including means for frequency shifting each component of said x(t) by a frequency $\alpha$;

first correlator means for generating an inverse of an autocorrelation matrix of said x(t), denoted $R_{xx}^{-1}$;

second correlator means for generating a correlation matrix of said x(t) and said reference vector r(t), denoted $R_{xr}$;

means for obtaining and updating a vector c* having M components, wherein c*isa conjugate of c: and means for generating a product of $gR_{xx}^{-1}R_{xx}c^*$ to provide said weight vector w, where g is an arbitrary scalar gain variable.

21. A processor for extracting a signal of interest s(t) from a signal input vector x(t) having M components in which each component comprises a complex measurement of s(t) togehter with interference from noise and/or other signals, comprising:

(a) means for receiving on an array of antennas upon which one or more signals impinges, a plurality of input signals represented by a signal input vector x(t) having M components in which each component comprises an electrical signal representing a complex measurement of a self-coherent signal of interest s(t) together with interference from noise and/or other signals;

(b) means for decomposing said signal input vector x(t) into two disjoint frequency bands $x_1(t)$ and $x_2(t)$ having center frequencies separated by a cycle frequency $\alpha$, where each of $x_1(t)$ and $x_2(t)$ satisfies a narrowband condition, wherein said means for decomposing has an input coupled to an output of said means for receiving;

(c) reference means for generating a reference vector $r_1(t)$ equal to $x_2(t)$ and for generating a reference vector $r_2(t)$ equal to $x_1(t)$, wherein said reference means has an input coupled to an output of said means for decomposing;

(d) weight means for obtaining and updating a weight vector w(1) from said $x_1(t)$ and said $r_1(t)$, and for obtaining and updating a weight vector w(2) from said $x_2(t)$ and said $r_2(t)$ where both said weight vectors w(1) and w(2) have M components, wherein said weight means has an input coupled to an output of said reference means;

(e) summing means, having a first input coupled to an output of said means for receiving and a second input coupled to an output of said weight means, for reconstructing a wideband desired signal y(t) having a measure of self-coherence by adding the outputs $$y(t) = w^t(1)x_1(t) + w^t(2)x_2(t)$$

and wherein said weight means obtains and updates said weight vectors w(1) and w(2) to maximize self-coherence in said output signal y(t).

22. A processor for extracting a signal of interest s(t) from a signal input vector x(t) having M components in which each component comprises a complex measurement of s(t) together with interference from noise and/or other signals, comprising:

(a) means for receiving on an array of antennas upon which one or more signals impinges, a plurality of input signals represented by a signal input vector x(t) having M components in which each component comprises an electrical signal representing a complex measurement of a conjugate self-coherent signal of interest s(t) together with interference from noise and/or other signals;

(b) means for decomposing said signal input vector x(t) into two disjoint frequency bands $x_1(t)$ and $x_2(t)$ having center frequencies separated by a cycle frequency $\alpha$, where each of said $x_1(t)$ and said $x_2(t)$ satisfies a narrowband condition, wherein said means for decomposing has an input coupled to an output of said means for receiving;

(c) reference means for generating a reference vector $r_1(t)$ equal to said $x_2(t)$ and for generating a reference vector $r_2(t)$ equal to said $x_1(t)$, wherein said reference means has an input coupled to an output of said means for decomposing;

(d) weight means for obtaining and updating a weight vector $w(1)$ from said $x_1(t)$ and said $r_1(t)$ and for obtaining and updating a weight vector $w(2)$ from said $x_2(t)$ and said $r_2(t)$, where both said weight vectors $w(1)$ and $w(2)$ have M components, wherein said weight means has an input coupled to an output of said reference means; and (e) summing means for reconstructing a wideband desired signal $y(t)$ having a measure of conjugate self-coherence by adding the outputs $$y(t) = w\dagger(1)x_1(t) + w\dagger(2)x_2(t)$$

and wherein said weight means obtains and updates said weight vectors $w(1)$ and $w(2)$ to maximize conjugate self-coherence in said output signal $y(t)$.

23. A processor for extracting a signal of interest $s(t)$ from a wide band signal input vector $x(t)$ having M components in which each component comprises a complex measurement of $s(t)$ together with interference from noise and/or other signals, comprising:

(a) means for receiving on an array of antennas upon which one or more signals impinges, a plurality of input signals represented by a signal input vector $x(t)$ having M components in which each component comprises an electrical signal representing a complex measurement of a self-coherent signal of interest $s(t)$ together with interference from noise and/or other signals;

(b) weight means for obtaining and updating a weight vector w having M components from said signal input vector $x(t)$, said weight means having an input coupled to an output of said means for receiving;

(c) summing means for generating an output signal $y(t)$ having a measure of self-coherence, wherein said summing means has a first input coupled to an output of said means for receiving and a second input coupled to an output of said weight means;

(d) wherein said weight means obtains and updates said weight vector w to maximize self-coherence in said output signal $y(t)$; and (e) filter means for jointly restoring spectral coherence of said output signal $y(t)$.

24. The processor of claim 23 wherein said filter means is a tapped delay line of length K and tap spacing $Y_o$ added to each antenna for receiving said $x(t)$ according to the equation $$\tilde{x}(t) = [x(t), x(t-\tau_o), \ldots x(t-(k-1)\tau_o)]^T$$

where $[\ ]^T$ denotes a transpose.

25. The processor of claim 24, further including:
reference signal means, coupled to an output of said means for receiving, for generating a reference vector $r(t)$ from said $x(t)$, said reference signal means including means for filtering each component of said $x(t)$ through a predetermined filter, and means for frequency shifting each component of said $x(t)$ by a frequency $\alpha$;

first correlator means for generating an inverse of an autocorrelation matrix of said $x(t)$, denoted $R_{xx}^{-1}$;

second correlator means for generating a correlation matrix of said $x(t)$ and said reference vector $r(t)$, denoted $R_{xr}$;

means for obtaining and updating a vector c having M components; and means for generating a product of $gR_{xx}^{-1}R_{xr}c$ to provide said weight vector w, where g is an arbitrary scalar gain variable.

26. A processor for extracting a signal of interest $s(t)$ from a wideband signal input vector $x(t)$ having M components in which each component comprises a complex measurement of $s(t)$ together with interference from noise and/or other signals, comprising:

(a) means for receiving on an array of antennas upon which one or more signals impinges, a plurality of input signals represented by a signal input vector $x(t)$ having M components in which each component comprises an electrical signal representing a complex measurement of a conjugate self-coherent signal of interest $s(t)$ together with interference from noise and/or other signals;

(b) weight means for obtaining and updating a weight vector w having M components from said $x(t)$, wherein said weight means has an input coupled to an output of said means for receiving;

(c) summing means for generating an output signal $y(t)$ having a measure of conjugate self-coherence, wherein said summing means has a first input coupled to an output of said means for receiving and a second input coupled to an output of said weight means;

(d) wherein said weight means obtains and updates said weight vector w to maximize conjugate self-coherence in said output signal $y(t)$; and (e) filter means for jointly restoring spectral coherence of said output signal $y(t)$.

27. The processor of claim 26 wherein said filter means is a tapped delay line of length K and tap spacing $\tau_o$ added to each antenna for receiving said $x(t)$ according to the equation $$\tilde{x}(t) = [x(t), x(t-\tau_o), \ldots x(t-(K-1)\tau_o)]^T$$

where $[\ ]^T$ denotes a transpose.

28. The processor of claim 27, further including:
reference signal means for generating a reference vector $r(t)$ from said $x(t)$, said reference signal means being coupled to an output of said means for receiving, and including means for filtering each component of said $x(t)$ through a predetermined filter, means for replacing each said filtered each component by the complex conjugate thereof, and further including means for frequency shifting each component of said $x(t)$ by a frequency $\alpha$;

first correlator means for generating an inverse of an autocorrelation matrix of said $x(t)$, denoted $R_{xx}^{-1}$;

second correlator means for generating a correlation matrix of said $x(t)$ and said reference vector $r(t)$, denoted $R_{xr}$;

means for obtaining and updating a vector $c^*$ having M components, wherein $c^*$ is a conjugate of c; and means for generating a product of $gR_{xx}^{-1}R_{xr}c^*$ to provide said weight vector w, where g is an arbitrary scalar gain variable.

29. A processor for extracting at least one signal of interest s(t) from a signal input vector x(t) in which each component comprises a complex measurement of s(t) together with interference from noise and/or other signals, comprising:

(a) receiving means for receiving on an array of antennas upon which one or more signals impinges, a plurality of input signals represented by a signal input vector x(t) having M components in which each component comprises an electrical signal representing a complex measurement of a self-coherent signal of interest s(t) contained in said input signals together with interference from noise and/or other signals;

(b) reference signal means, having an input coupled to an output of said receiving means, for generating and updating a reference signal vector r(t) from said signal input vector x(t), said reference signal means including means for filtering each component of said signal input vector x(t) through a predetermined filter, said reference signal means further including means for frequency shifting each component of said signal input vector x(t) by frequency $\alpha$;

(c) first correlator means, having an input coupled to an output of said reference signal means, for computing and updating an r(t) inverse autocorrelation matrix, denoted $R_{rr}^{-1}$;

(d) second correlator means, having a first input coupled to an output of said reference signal means, and a second input coupled to receive said x(t), for computing and updating a correlation matrix of x(t) and r(t), denoted $R_{xr}$;

(e) means for computing a matrix F, having a first input coupled to an output of said first correlator means and a second input coupled to an output of said second correlator means, where $$F = (A^t A)^{-1} A R_{xr} R_{rr}^{-1}$$ and where A contains direction vectors corresponding to a given set of direction of arrival estimates associated with said signal s(t) and $A = [a(\Theta_1) \ldots a(\Theta_d)]$;

(f) means for generating a signal $\hat{s}(t)$, having a first input coupled to said means for computing, and a second input coupled to an output of said reference signal means, by computing a vector product of F and r(t) such that the following expression is minimized $$\min_{\Theta_d, \hat{s}(t)} < ||x(t) - [a(\Theta_1) \ldots a(\Theta_d)]\hat{s}(t)||^2 > \Theta_1, \ldots,$$

where d is the number of transmitted signals being received by the processor; and (g) output means for generating an output signal y(t) by computing a vector product of F and said signal input vector x(t), said output means having a first input coupled to an output of said means for computing and a second input coupled to said receiving means.

30. A processor for extracting at least one signal of interest s(t) from a signal input vector x(t) in which each component comprises a complex measurement of s(t) together with interference from noise and/or other signals, comprising:

(a) receiving means for receiving on an array of antennas upon which one or more signals impinges, a plurality of input signals represented by a signal input ector x(t) having M components in which each component comprises an electrical signal representing a complex measurement of a conjugate self-coherent signal of interest s(t) contained in said input signals together with interference from noise and/or other signals;

(b) reference signal means, having an input coupled to receiving means, for generating and updating a reference signal vector r(t) from said signal input vector x(t), said reference signal means including means for filtering each component of said signal input vector x(t) through a predetermined filter, said reference signal means further including means for replacing each said filtered component by a complex conjugate thereof and means for frequency shifting each component of x(t) by frequency $\alpha$;

(c) first correlator means, having an input coupled to an output of said reference signal means, for computing and updating an r(t) inverse autocorrelation matrix, denoted $R_{rr}^{-1}$;

(d) second correlator means, having a first input coupled to an output of said reference signal means and a second input coupled to receive said receiving means, for computing and updating a correlation matrix of x(t) and r(t), denoted $R_{xr}$;

(e) means for computing a matrix F, having a first input coupled to an output of said first correlator means and a second input coupled to an output of said second correlator means, where $$F = (A^t A)^{-1} A R_{xr} R_{rr}^{-1}$$

and A contains direction vectors corresponding to a given set of direction of arrival estimates associated with said signal of interest s(t), and $$A = [a(\Theta_1) \ldots a(\Theta_d)];$$

(f) means for generating a signal $\bar{s}(t)$, having a first input coupled to said means for computing and a second input coupled to an output of said reference signal means, by computing a vector product of F and r(t) such that the following expression is minimized $$\min_{\Theta_d, s(t)} < ||s(t) - [a(\Theta_1) \ldots a(\Theta_d)]\bar{s}(t)^*||^2 > \Theta_1, \ldots,$$

where d is the number of transmitted signals being received by the processor; and (g) output means for generating an output signal y(t) by computing a vector product of F and signal input vector x(t), said output means having a first input coupled to an output of said means for computing and a second input coupled to said receiving means.

31. The processor of claims 29 or 30, further comprising:

means for computing a projection matrix denoted $P_A$ where $$P_a = A (A^t A)^{-1} A^t;$$

means for computing $R_\alpha$ where $$R_\alpha = R_{xr} R^{-1}{}_{rr} R_{rx};$$

and means for performing a multidimensional search over $\Theta_1, \ldots, \Theta_d$ for maximization of $$\max_{\Theta_1,\ldots,\Theta_d} tr\{P_A R_a\}$$

where tr{ } is a trace operator.

32. The processor of claim 31, further including means for estimating d, comprising:
  means for obtaining a maximum value of $tr\{P_a R_a\}$ assuming that $d=1$;
  means for obtaining said maximum value under a sequence of assumptions $d=2, d=3, \ldots$, until a maximum value obtained for some value of d is approximately equal to the maximum value obtained for $d+1$, at which point said assumed value of d is taken to be the true value of d.

33. The processor of claims 29 or 30, further comprising:
  means for computing a projection matrix denoted $P_A$ where $$P_A = A (A^t A)^{-1} A^t$$

and means for performing a multidimensional search over $\Theta_1, \ldots, \Theta_d$ for maximization of $$\max_{\Theta_1,\ldots,\Theta_d} tr\{P_A R_{xr}\}$$

where tr{ } is a trace operator.

34. The processor of claim 33, further including means for estimating d, comprising:
  means for obtaining a maximum value of $tr\{P_A R_a\}$ assuming that $d=1$;
  means for obtaining said maximum value under a sequence of assumptions $d=2, d=3, \ldots$, until a maximum value obtained for some value of d is approximately equal to the maximum value obtained for $d+1$, at which point said assumed value of d is taken to be the true value of d.

35. The processor of claim 29 or 30, further including means for estimating d, comprising:
  means for obtaining a maximum value of $tr\{P_A R_a\}$ assuming that $d=1$; and
  means for obtaining said maximum value under a sequence of assumptions $d=2, d=3 \ldots$, until the maximum value obtained for some value of d is approximately equal to the maximum value obtained for $d+1$, at which point said assumed value of d is taken to be the true value of d.

36. An apparatus for extracting a signal of interest s(t) from a signal input vector x(t) having M components, each component having an associated phase such that a set of said M phases jointly contains direction of arrival information for all signals presented to the apparatus, and in which each component comprises a complex measurement of s(t) together with interference from noise and/or other signals, comprising:
  (a) means for receiving on an array of sensors upon which one or more signals impinges, a plurality of input signals represented by a signal input vector x(t) having M components in which each component comprises an electrical signal representing a complex measurement of a self-coherent signal of interest s(t) contained in said input signals together with interference from noise and/or other signals and in which each component has an associated phase such that a set of said M phases jointly contains direction of arrival information for all said signals;
  (b) reference signal means, coupled to an output of said means for receiving, for generating a reference signal vector r(t) from said signal input vector x(t), said reference signal means including means for filtering each component of said signal input vector x(t) through a predetermined filter and means for frequency shifting each component of said x(t) by a frequency $\alpha$;
  (c) first correlator means, coupled to said reference signal means, for generating and updating a correlation matrix of said signal input vector x(t) and said reference signal vector r(t), denoted $R_{xr}$;
  (d) weight means, having an input coupled to an output of said first correlator means, for providing and updating a weight vector w having M components from said signal input vector x(t) according to the equation $$\lambda w = R_{xr} w,$$

where $\lambda$ is non-negligible;
  (e) summing means for generating an output signal y(t) having a measure of self-coherence, wherein said summing means has a first input coupled to an output of said means for receiving and a second input coupled to an output of said weight means;
  (f) wherein said weight means obtains and updates said weight vector w to maximize self-coherence in said output signal y(t);
  (g) means for generating a matrix $E_N$ including eigenvectors having eigenvalues, where $$E_N[w_{d+1} \, w_{d+2} \cdots w_M],$$

and the following equation holds $$\lambda_i w_i = R_{xr} w_i$$

where M is the number of sensors, $i=1, 2, \ldots, M$ and $w_i$ is an ith eigenvector, and eigenvalues $\lambda_{d+1}, \ldots, \lambda_M$ are negligibly small compared with $\lambda_1, \ldots, \lambda_d$, d being defined from such partitioning of the eigenvalues;
  (h) means for generating a measure of orthogonality $P_1(\Theta)$ containing at least one peak, where $$P_1(\Theta) = ||(E_N)^t a(\Theta)||^{-2}$$

and where ( )$^t$ denotes a Hermitian transpose operation, $\Theta$ is a direction of arrival estimation parameter, and $a(\Theta)$ is a corresponding direction vector; and
  (i) means for locating peaks in said measure of orthogonality, said peaks corresponding to estimated directions of arrival for said signal of interest s(t).

37. An apparatus for extracting a signal of interest s(t) from a signal input vector x(t) having M components, each component having an associated phase such that a set of said M phases jointly contains direction of arrival information for all signals presented to the apparatus, and in which each component comprises a complex measurement of s(t) together with interference from noise and/or other signals, comprising:

(a) means for receiving on an array of sensors upon which one or more signals impinges, a plurality of input signals represented by a signal input vector x(t) having M components in which each component comprises an electrical signal representing a complex measurement of a conjugate self-coherent signal of interest s(t) contained in said input signals together with interference from noise and/or other signals and in which each component has an associated phase such that a set of said M phases jointly contains direction of arrival information for all said signals;

(b) reference signal means, coupled to an output of said means for receiving, for generating a reference signal vector r(t) from said signal input vector x(t), said reference signal means including means for filtering each component of said x(t) through a predetermined filter, said reference signal means further including means for replacing each said filtered component by the complex conjugate thereof and means for frequency shifting each component of said signal input vector x(t) by a frequency α;

(c) first correlator means, coupled to said reference signal means for generating and updating a correlation matrix of said signal input vector x(t) and said reference signal vector r(t), denoted $R_{xr}$;

(d) weight means, having an input coupled to an output of said first correlator means, for providing and updating a weight vector w having M components from signal input vector x(t) according to the equation $$\lambda w = R_{xr} w,$$

where λ is non-negligible;

(e) summing means for generating an output signal y(t) having a measure of conjugate self-coherence, wherein said summing means has a first input coupled to an output of said means for receiving and a second input coupled to an output of said weight means;

(f) wherein said weight means obtains and updates said weight vector w to maximize conjugate self-coherence in said output signal y(t);

(g) means for generating a matrix $E_N$ including eigenvectors having eigenvalues, where $$E_N = [w_{d+1} w_{d+2} \ldots w_M],$$

and the following equation holds $$\lambda_i w_i = R_{xr} w_i$$

where M is the number of sensors, i = 1, 2, ..., M and $w_i$ is an ith eigenvector, and eigenvalues $\lambda_{d+1}$, ..., $\lambda_M$ are negligibly small compared with $\lambda_1$, ..., $\lambda_d$, d being defined from such partitioning of the eigenvalues;

(h) means for generating a measure of orthogonality $P_1(\Theta)$ containing at least one peak where $$P_1(\Theta) = ||(E_N)^T a(\Theta)||^{-2}$$

and where $(\ )^T$ denotes a transpose operation, Θ is a direction of arrival estimation parameter, and a(Θ) is a corresponding direction vector; and (i) means for locating peaks in said measure of orthogonality, said peaks corresponding to estimated directions of arrival for said signal of interest s(t).

38. An apparatus for extracting a signal of interest s(t) from a signal input vector x(t) having M components, each component having an associated phase such that a set of said M phases jointly contains direction of arrival information for all signals presented to the apparatus, and in which each component comprises a complex measurement of s(t) together with interference from noise and/or other signals, comprising:

(a) means for receiving on an array of sensors upon which one or more signals impinges, a plurality of input signals represented by a signal input vector x(t) having M components in which each component comprises an electrical signal representing a complex measurement of a self-coherent signal of interest s(t) contained in said input signals together with interference from noise and/or other signals and in which each component has an associated phase such that a set of said M phases jointly contains direction of arrival information for all said signals;

(b) weight means for obtaining and updating a weight vector w having M components from said signal input vector x(t), said weight means having an input coupled to an output of said means for receiving;

(c) summing means for generating an output signal y(t) having a measure of self-coherence, wherein said summing means has a first input coupled to an output of said means for receiving and a second input coupled to an output of said weight means;

(d) wherein said weight means obtains and updates said weight vector w to maximize self-coherence in said output signal y(t);

(e) means for decomposing said signal input vector x(t), wherein said signal input vector x(t) is a wideband signal input vector, into $x_1(t)$ and $x_2(t)$ to form two disjoint frequency bands;

(f) first correlator means for generating a correlation matrix of $R_{xr}$ according to the equation $$R_{xr} R_{x_1 x_2}(\tau);$$

(g) means for generation λwhere $$\lambda w = R_{xr} w;$$

(h) means for generating a matrix $E_N$ including eigenvectors having eigenvalues where $$E_N = [w_{d+1} w_{d+2} \ldots w_M]$$

and the following equation holds $$\lambda_i w_i = R_{xr} w_i$$

where M is a number of sensors, $w_i$ is an ith eigenvector and eigenvalues $\lambda_{d+1}, \ldots, \lambda_M$ are negligibly small compared with $\lambda_1, \ldots, \lambda_d$, d being defined from such partitioning of the eigenvalues;

(i) means for generating a measure of orthogonality $P_1(\Theta)$ containing at least one peak, where $$P_1(\Theta) = ||(E_N) a(\Theta)||^{-2}$$

and where $(\ )^t$ denotes a Hermitian transpose operation, Θ is a direction of arrival estimation parameter, and a (Θ) is a corresponding direction vector for a frequency band corresponding to $x_2(t)$; and (j) means for locating peaks in said measure of orthogonality, said peaks corresponding to estimated directions of arrival for said signal of interest s(t).

39. An apparatus for extracting a signal of interest s(t) from a signal input vector x(t) having M components, each component having an associated phase such that a set of said M phases jointly contains direction of arrival information for all signals presented to the apparatus, and in which each component comprises a complex measurement of s(t) together with interference from noise and/or other signals, comprising:

(a) means for receiving on an array of sensors upon which one or more signals impinges, a plurality of input signals represented by a signal input vector x(t) haing M components in which each component comprises an electrical signal representing a complex measurement of a conjugate self-coherent signal of interest s(t) contained in said input signals together with interference from noise and/or other signals and in which each component has an associated phase such that a set of said M phases jointly contains direction of arrival information for all said signals;

(b) weight means for obtaining and updating a weight vector w having M components from said signal input vector x(t), said weight means having an input coupled to an output of said means for receiving;

(c) summing means for generating an output signal y(t) having a measure of conjugate self-coherence, wherein said summing means has a first input coupled to an output of said means for receiving and a second input coupled to an output of said weight means;

(d) wherein said weight means obtains and updates said weight vector w to maximize self-coherence in said output signal y(t);

(e) means for decomposing said signal input vector x(t), wherein said signal input vector x(t) is a wideband signal input vector, into $x_1(t)$ and $x_2(t)$ to form two disjoint frequency bands;

(f) first correlator means for generating a correlation matrix of $R_{xr}$ according to the equation $$R_{xr} = R_{x_1 x_2}(\tau);$$

(g) means for generating λ where $$\lambda w = R_{xr} w;$$

(h) means for generating a matrix $E_N$ inclujding eigenvectors having eigenvalues where $$E_N = [w_{d+1} \, w_{d+2} \cdots w_M]$$

and the following equation holds $$\lambda_i w_i = R_{xr} w_i$$

where M is the number of sensors, $w_i$ is an ith eigenvector and eigenvalues $\lambda_{d+1}, \ldots, \lambda_M$ are negligibly small compared with $\lambda_1, \ldots, \lambda_d$, d being defined from such partitioning of the eigenvalues;

(i) means for generating a measure of orthogonality $P_1(\Theta)$ containing at least one peak, where $$P_1(\Theta) = ||(E_N)^T a(\Theta)||^{-2}$$

and where $(\ )^T$ denotes a transpose operation, Θ is a direction of arrival estimation parameter, and a(Θ) is a corresponding direction vector for a frequency band corresponding to $x_2(t)$; and (j) means for locating peaks in said measure of orthogonality, said peaks corresponding to estimated directions of arrival for said signal of interest s(t).

40. An apparatus for extracting a signal of interest s(t) from a signal input vector x(t) having M components, each component having an associated phase such that a set of said M phases jointly contains direction of arrival information for all signals presented to the processor, and in which each component comprises a complex measurement of s(t) together with interference from noise and/or other signals, comprising:

(a) means for receiving on an array of sensors upon which one or more signals impinges a plurality of input signals represented by a signal input vector x(t) having M components in which each component comprises an electrical signal representing a complex measurement of a self-coherent signal of interest s(t) contained in said input signals together with interference from noise and/or other signals and in which each component has an associated phase such that a set of said M phases jointly contains direction of arrival information for all said signals;

(b) weight means for obtaining and updating a weight vector w having M components from said signal input vector x(t), said weight means having an input coupled to an output of said means for receiving;

(c) summing means for generating an output signal y(t) having a measure of self-coherence, wherein said summing means has a first input coupled to an output of said means for receiving and a second input coupled to an output of said weight means;

(d) wherein said weight means obtains and updates said weight vector w to maximize self-coherence in said output signal y(t);

(e) means for decomposing said signal input vector x(t), wherein signal input vector x(t) is a wideband signal input vector, into K+k narrow frequency bands;

(f) means for computing correlation matrices of $$R_{xj+kxj} \text{ where}$$

$$R_{xj+kxj} = \langle x_{j+k}(t) x^t_j(t) \rangle;$$

(g) means for computing $\lambda w = R_{xj+kxj} w$;

(h) means for generating matrices $E_N(1), \ldots, E_N(k)$ including eigenvectors having eigenvalues where $$E_N(j) = [w_{d+1}(j) w_{d+2}(j) \cdots w_M(j)]$$

an dwhere $j = 1, \ldots, K$ and the following equation holds for $i = 1, \ldots, M$, M being the number of sensors, $$\lambda_i(j) w_i(j) = R_{xj+kxj} w_i(j)$$

where $w_i(j)$ is an ith eigenvector of $R_{xj+kxj}$, eigenvalues $\lambda_{d+1}(j), \ldots, \lambda_M(j)$ being negligibly small compared with $\lambda_1(j), \ldots, \lambda_d(j)$, and d is defined by such partitioning of the eigenvalues;

(i) means for generating a measure of orthogonality $P(\Theta, j)$ containing at least one peak, where $$P(\Theta, j) = ||(E_N(j))^\dagger a(f_j,\Theta)||^{-2}$$

and where $j=1, \ldots, K$ and $(\ )^\dagger$ denotes a Hermitian transpose operation, $\Theta$ is a direction of arrival estimation parameter, and $a(f_j,\Theta)$ is a corresponding direction vector for a jth frequency band which has center frequency $f_j$; and (j) means for locating peaks in said measure of orthogonality, said peaks corresponding to estimated directions of arrival for said signal of interest s(t).

41. An apparatus for extracting a signal of interest s(t) from a signal input vector x(t) having M components, each component having an associated phase such that a set of said M phases jointly contains direction of arrival information for all signals presented to the processor, and in which each component comprises a complex measurement of s(t) together with interference from noise and/or other signals, comprising:

(a) means for receiving on an array of sensors upon which one or more signals impinges, a plurality of input signals represented by a signal input vector x(t) having M components in which each component comprises an electrical signal representing a complex measurement of a conjugate self-coherent signal of interest s(t) contained in said input signals together with interference from noise and/or other signals and in which each component has an associated phase such that a set of said M phases jointly contains direction of arrival information for all said signals;

(b) weight means for obtaining and updating a weight vector w having M components from said signal input vector x(t), said weight means having an input coupled to an output of said means for receiving;

(c) summing means for generating an output signal y(t) having a measure of self-coherence, wherein said summing means has a first input coupled to an output of said means for receiving and a second input coupled to an output of said weight means;

(d) wherein said weight means obtains and updates said weight vector w to maximize self-coherence in said output signal y(t);

(e) means for decomposing said signal input vector x(t), wherein said signal input vector x(t) is a wideband signal input vector, into K+k narrow frequency bands;

(f) means for computing correlation matrices of $R_{xj+kxj}$, where $$R_{xj+kxj} = <x_{j+k}(t)x_j^T(t)>;$$

(g) means for computing $\lambda w = R_{xj+kxj} w$;

(h) means for generating matrices $E_N(1), \ldots, E_N(k)$ including eigenvectors having eigenvalues where $$E_N(j) = [w_{d+1}(j) w_{d+2}(j) \ldots w_M(j)]$$

and where $j=1, \ldots, K$ and the following equation holds for $i=1, \ldots, M$, M being the number of sensors, $$\lambda_i(j) w_i(j) = R_{xj+kxj} w_i(j)$$

where $w_i(j)$ is an ith eigenvector of $R_{xj+kxj}$, eigenvalues $\lambda_{d+1}(j), \ldots, \lambda_M(j)$ being negligibly small compared with $\lambda_1(j), \ldots, \lambda_d(j)$, and d is defined by such partitioning of the eigenvalues;

(i) means for generating a measure of orthogonality $P(\Theta,j)$ containing at least one peak, where $$P(\Theta,j) = ||(E_N(j))^T a(f_j,\Theta)||^{-2}$$

and where $j=1, \ldots, K$ and $(\ )^T$ denotes a transpose operation, $\Theta$ is a direction of arrival estimation parameter, and $a(f_j,\Theta)$ is a corresponding direction vector for a jth frequency band which has center frequency $f_j$; and (j) means for locating peaks in said measure of orthogonality, said peaks corresponding to estimated directions of arrival for said signal of interest s(t).

* * * * *